(12) United States Patent
Takai et al.

(10) Patent No.: US 7,326,085 B2
(45) Date of Patent: Feb. 5, 2008

(54) IC CARD WRONG INSERTION PREVENTING MECHANISM AND IC CARD CONNECTOR HAVING THE SAME

(75) Inventors: Yosuke Takai, Sakura (JP); Osamu Shimizu, Yokohama (JP); Kiyotaka Henmi, Funabashi (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 11/634,991

(22) Filed: Dec. 7, 2006

(65) Prior Publication Data
US 2007/0134965 A1 Jun. 14, 2007

(30) Foreign Application Priority Data
Dec. 9, 2005 (JP) .............................. 2005-356433

(51) Int. Cl.
*H01R 24/00* (2006.01)
(52) U.S. Cl. ....................................... 439/630; 439/138
(58) Field of Classification Search ................ 439/630, 439/633, 159
See application file for complete search history.

(56) References Cited

U.S. PATENT DOCUMENTS

| | | |
|---|---|---|
| 4,404,464 A | 9/1983 | Moreno |
| 4,421,372 A | 12/1983 | Golden |
| 4,722,693 A | 2/1988 | Rose |
| 5,035,633 A | 7/1991 | Kobayashi et al. |
| 5,179,504 A | 1/1993 | Kitahara |
| 5,207,598 A | 5/1993 | Yamada et al. |
| 5,300,763 A | 4/1994 | Ito et al. |
| 5,490,791 A | 2/1996 | Yamada et al. |
| 5,563,397 A | 10/1996 | Fujimoto et al. |
| 5,876,218 A | 3/1999 | Liebenow et al. |
| 6,056,573 A | 5/2000 | Nishioka |
| 6,068,365 A | 5/2000 | Kantner |
| 6,068,500 A | 5/2000 | Kantner |
| 6,109,940 A | 8/2000 | Chad et al. |
| 6,123,557 A | 9/2000 | Wang et al. |
| 6,129,572 A | 10/2000 | Feldman et al. |
| 6,135,809 A | 10/2000 | Asakawa |
| 6,203,378 B1 | 3/2001 | Shobara et al. |
| 6,345,760 B1 | 2/2002 | Eason et al. |

(Continued)

FOREIGN PATENT DOCUMENTS

DE    3 937 383 A1    6/1990

(Continued)

OTHER PUBLICATIONS

English Abstract for Japanese Publication No. 08055661, dated Feb. 27, 1996, Application No. 06219371, application date Aug. 10, 1994, for inventor Yoshikawa Takamasa, Title: Card Connecting Adaptor.

(Continued)

*Primary Examiner*—Neil Abrams
*Assistant Examiner*—Harshad Patel
(74) *Attorney, Agent, or Firm*—Finnegan, Henderson, Farabow, Garrett & Dunner, LLP

(57) ABSTRACT

Engaging portions of a wrong insertion restraining member for restraining wrong insertion of a MINI SD CARD have respective notches engaging the outer edges of openings of locking members.

5 Claims, 20 Drawing Sheets

U.S. PATENT DOCUMENTS

| | | |
|---|---|---|
| 6,361,369 B1 | 3/2002 | Kondo et al. |
| 6,386,920 B1 | 5/2002 | Sun |
| 6,399,906 B1 | 6/2002 | Sato et al. |
| 6,402,529 B2 * | 6/2002 | Saito et al. .................. 439/74 |
| 6,413,108 B2 | 7/2002 | Centofante |
| 6,457,647 B1 | 10/2002 | Kurihashi et al. |
| 6,468,101 B2 | 10/2002 | Suzuki |
| 6,482,029 B2 | 11/2002 | Nishimura |
| 6,503,092 B1 | 1/2003 | Sato |
| 6,511,350 B1 | 1/2003 | Ito et al. |
| 6,524,137 B1 | 2/2003 | Kuo |
| 6,527,590 B2 | 3/2003 | Oguchi |
| 6,601,766 B2 | 8/2003 | Nakagawa et al. |
| 6,607,404 B1 | 8/2003 | Ito et al. |
| 6,612,492 B1 | 9/2003 | Yen |
| 6,641,413 B2 | 11/2003 | Kurodu |
| 6,666,724 B1 | 12/2003 | Lwee |
| 6,699,053 B2 | 3/2004 | Kuroda |
| 6,699,061 B2 | 3/2004 | Abe et al. |
| 6,700,788 B2 | 3/2004 | Matsushita et al. |
| 6,716,066 B1 | 4/2004 | Kuo |
| 6,780,062 B2 | 8/2004 | Liu et al. |
| 6,783,399 B2 | 8/2004 | Joung |
| 6,863,571 B2 * | 3/2005 | Sato et al. .................. 439/630 |
| 6,976,879 B2 * | 12/2005 | Shishikura et al. ......... 439/630 |
| 7,182,645 B2 | 2/2007 | Shimizu et al. |
| 2003/0157839 A1 | 8/2003 | Yamaguchi et al. |
| 2004/0026507 A1 | 2/2004 | Nagata et al. |
| 2004/0106326 A1 | 6/2004 | Hsieh |
| 2004/0110423 A1 | 6/2004 | Shishikura et al. |

FOREIGN PATENT DOCUMENTS

| | | |
|---|---|---|
| DE | 4 139 482 | 6/1993 |
| EP | 0 284 431 A2 | 9/1988 |
| EP | 0 696 008 A2 | 2/1996 |
| EP | 1 487 001 B1 | 9/1997 |
| EP | 0 936 705 A2 | 8/1999 |
| EP | 0 939 582 A2 | 9/1999 |
| EP | 1 146 474 A1 | 10/2001 |
| EP | 1 324 256 A1 | 7/2003 |
| JP | 63-133473 | 6/1988 |
| JP | 07-335321 | 12/1995 |
| JP | 10-21348 | 1/1998 |
| JP | 10-091729 | 4/1998 |
| JP | 10-187896 | 7/1998 |
| JP | 2784346 | 8/1998 |
| JP | 11-316110 | 11/1999 |
| JP | 2000-277200 | 6/2000 |
| JP | 2000-251024 | 9/2000 |
| JP | 2000-251025 | 9/2000 |
| JP | 2001-135385 | 5/2001 |
| JP | 2001-195546 | 7/2001 |
| JP | 2001-237027 | 8/2001 |
| JP | 2002-157056 | 5/2002 |
| JP | 2002-164124 | 6/2002 |
| JP | 2002-174532 | 6/2002 |
| JP | 2002-289295 | 10/2002 |
| JP | 2003-288962 | 10/2003 |
| JP | 2003-317858 | 11/2003 |
| JP | 2004-58232 | 2/2004 |
| JP | 2004-193111 | 7/2004 |
| JP | 2005-011666 | 1/2005 |
| JP | 2005-135696 | 5/2005 |
| JP | 2005-243434 | 9/2005 |

OTHER PUBLICATIONS

European Patent Office Search Report dated Mar. 1, 2004, for European Patent Application No. 00971781.0.

International search Report Application No. PCT/JP00/007762, dated Feb. 6, 2001 from the European Patent Office.

Official Action from Japanese Patent Office for Application No. 2003-385753, mailed Jun. 14, 2005.

* cited by examiner

IC CARD WRONG INSERTION PREVENTING MECHANISM AND IC CARD CONNECTOR HAVING THE SAME

This application claims the benefit of Japanese Patent Application No. 2005-356433 filed Dec. 9, 2005, which is hereby incorporated by reference herein in its entirety.

BACKGROUND OF THE INVENTION

1. Field of the Invention

The present invention relates to an IC (integrated circuit) card wrong insertion preventing mechanism and an IC card connector incorporating the mechanism in a multiple card accommodation portion thereof.

2. Description of the Related Art

In general, the functions of electronic apparatus are expanded in various ways by mounting IC cards such as MMCs (multimedia cards (trademark)), SD (secure digital) cards, and MINI SD CARDs (trademark) in the apparatus through IC card connectors.

In order to allow a plurality of IC cards having different shapes to be mounted and used in a single electronic apparatus, for example, as shown in Japanese Patent Application Laid-open Nos. 2004-311416 and 2004-193111, a proposed IC card connectors are provided with a multiple card accommodation portion which has a common card slot to be commonly used for such IC cards and to and from which the IC cards are selectively mounded and removed one at a time.

In such an IC card connector having a multiple card accommodation portion, each card accommodation portions are formed in tiers while extending along the IC card mounting and removing direction such that they partially overlap each other. Groups of contact terminals associated with contact pads of respective IC cards are separately provided in the card accommodation portions.

In such a configuration, it is required to prevent a user from inserting a predetermined IC card into a card accommodation portion different from the correct card accommodation portion by mistake, and inserting operations must be performed such that an IC card can be smoothly mounted and removed while avoiding damage to contact terminals which are not used by the IC card.

According to some proposals on measures to satisfy such requirements, for example, as disclosed in Japanese Patent Application Laid-open Nos. 2004-311416 and 2004-193111, a wrong insertion preventing mechanism is provided in the neighborhood of a common card slot in a connector, the mechanism including a wrong insertion restraining member for restraining the insertion of a predetermined IC card into a wrong card accommodation portion.

For example, the wrong insertion preventing mechanism comprises a wrong insertion restraining member for restraining wrong insertion of a second IC card having a relatively small transverse width compared to a first IC card into a card accommodation portion for the first IC card, a lock/unlock mechanism for taking the wrong insertion restraining member in a first state (locked state) for restraining the insertion of the second IC card and a second state (unlocked state) to allow insertion of the first IC card having a relatively wide transverse width, and an urging member for urging the wrong insertion restraining member in the direction opposite to the card inserting direction.

The wrong insertion restraining member is provided substantially orthogonally to the direction in which the IC cards are mounted and removed such that it extends across an end of a card accommodation portion on the side of a card slot. A narrow opening allowing the first IC card to pass through is formed under the wrong insertion restraining member. Both ends of the wrong insertion restraining member are movably supported at the periphery of the card accommodation portion and configured such that they can be selectively engaged with engaging portions of locking members of the above-described lock/unlock mechanism. The engaging portions of the locking members can be elastically displaced.

In such a configuration, the wrong insertion restraining member is locked in the above-described first state when both ends of the same are engaged with the respective engaging portions of the locking member. More specifically, the insertion of the second IC card into the card accommodation portion of the first IC card is restrained by the wrong insertion restraining member that is in the locked state. The second IC card is mounted in a predetermined card accommodation portion through the narrow opening under the wrong insertion restraining member.

On the one hand, when the first IC card is mounted, the locking members are pressed by respective side parts of the inserted IC card immediately after the leading end of the IC card passes through the card slot, whereby both ends of the wrong insertion restraining member are disengaged from the engaging portions of the respective locking members.

Hereby, the wrong insertion restraining member is consequently unlocked from the locked state. When the IC card is further pushed in the card accommodation portion against the urging force of the above-described urging member, for example, the wrong insertion restraining member is moved to be retracted from the passage of the IC card, and the first IC card passes over the wrong insertion restraining member to be mounted in the card accommodation portion for the first IC card.

In the case of an IC card connector having a wrong insertion preventing mechanism as described above, when a user sets each IC card with the end of the card having no contact pad facing in the forward direction and erroneously inserts the card into a card accommodation portion from that end, so-called inverted insertion of an IC card might occur.

In such a case, when the first IC card is inserted in such a manner as the inverted insertion, since the end of the first IC card cannot be mounted on an eject mechanism provided in the card accommodation portion, further insertion of the card into the card accommodation portion is prevented even if the wrong insertion restraining member is unlocked from the locked state by the lock/unlock mechanism.

However, when the second IC card is inserted in such a manner as the inverted insertion, one of the locking members is pressed by one side part of the second IC card to disengage one end of the wrong insertion restraining member from the engaging portion of the locking member. When the wrong insertion restraining member is moved further by being pressed by the end of the second IC card, the urging force of the above-described urging member may be balanced with a restoring force of the locking member, and the end of the wrong insertion restraining member may consequently be kept in the unlocked state.

In such a case, the other locking member is subsequently pressed by the other side part of the second IC card in the same manner. Then, when the wrong insertion restraining member is further moved by being pressed by the end of the second IC card, both ends of the wrong insertion restraining member become unlocked. As a result, the first IC card may be inserted in the inverted insertion state by mistake, which can result in damage to contact terminals.

SUMMARY OF THE INVENTION

The invention confronts the above-described problem, and it is an object of the invention to provide an IC card wrong insertion preventing mechanism and an IC card connector including the IC card wrong insertion preventing mechanism in a multiple card accommodation portion and, more particularly, an IC card wrong insertion preventing mechanism which can reliably avoid a plurality of IC cards from being inserted in such a manner as the inverted insertion by mistake and an IC card connector having the same.

In order to achieve the above-described object, an IC card wrong insertion preventing mechanism according to the present invention is characterized in that it includes a wrong insertion restraining member extending in an IC card accommodation portion in a direction across an IC card mounting/removing direction and rotational movably supported, the wrong insertion restraining member being situated in a first position for guiding a leading end of a first IC card such that the leading end of the first IC card is oriented toward one direction when the first IC card is mounted in the IC card accommodation portion and being situated in a second position for guiding a leading end of a second IC card such that the leading end of the second IC card is oriented toward another direction when the second IC card is mounted in the IC card accommodation portion, an urging member for urging the wrong insertion restraining member in the direction of ejecting the first IC card, and a pair of locking members each including an elastically displaceable movable piece having an opening to be engaged with engaging portions formed on both ends of the wrong insertion restraining member and selectively keeping the wrong insertion restraining member in the second position when the second IC card is mounted in the IC card mounting part. The mechanism is also characterized in that each of the engaging portions of the wrong insertion restraining member has a notch to be engaged with an outer edge of the opening of the locking member when the wrong insertion restraining member is rotated at a predetermined angle in the second position.

An IC card wrong insertion preventing mechanism according to the present invention is characterized in that it includes a wrong insertion preventing movable member provided in an IC card accommodation portion such that it can be moved up and down while being slid in an IC card mounting/removing direction, the wrong insertion preventing movable member being situated in a first position for guiding a leading end of a first IC card such that the leading end of the first IC card is oriented toward one direction when the first IC card is mounted in the IC card accommodation portion and situated in a second position for guiding a leading end of a second IC card such that the leading end of the second IC card is oriented toward another direction when the second IC card is mounted in the IC card accommodation portion, a position control mechanism portion for situating the wrong insertion preventing movable member in the first position or second position, and a lock/unlock mechanism including a movable plate driving member connected with the wrong insertion preventing movable member and a locking member for selectively retraining the movement of the movable plate driving member in accordance with the mounting and removal of the first and second IC cards. The mechanism is also characterized in that at least either of the movable plate driving member and the locking member is provided with a hooked protrusion for selectively engaging them with each other when the movable plate driving member is moved with the wrong insertion preventing movable member situated in the second position.

Another IC card connector according to the present invention comprises an IC card accommodation portion for containing a first IC card or second IC card having different shapes each other, including a card slot through which either of the first and second IC cards can be selectively passed and a plurality of types of contact terminal groups for electrically connecting electrode portions of the first and second IC cards, and either of the above-described IC card wrong insertion preventing mechanisms.

As apparent from the above description, the IC card wrong insertion preventing mechanism and IC card connector having the same according to the present invention make it possible to reliably prevent a plurality of IC cards from being inserted in reverse by mistake because each of the engaging portions of the wrong insertion restraining member has a notch to be engaged with the outer edge of the opening of the locking member when the wrong insertion restraining member is rotated at a predetermined angle in the second position to prevent the engaging portions of the wrong insertion restraining member from being unlocked from the openings of the locking members.

Further features of the present invention will become apparent from the following description of exemplary embodiments (with reference to the attached drawings).

Figure 11A:
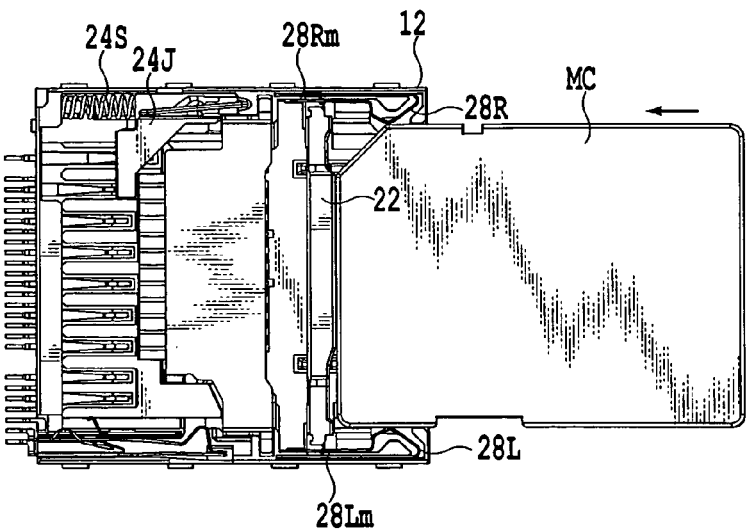
Figure 11B:
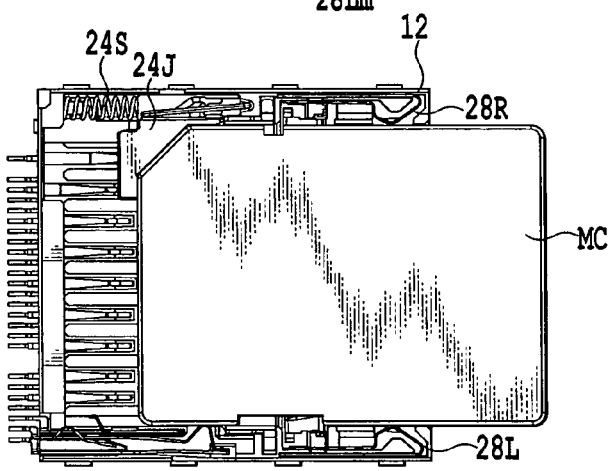
Figure 11C:
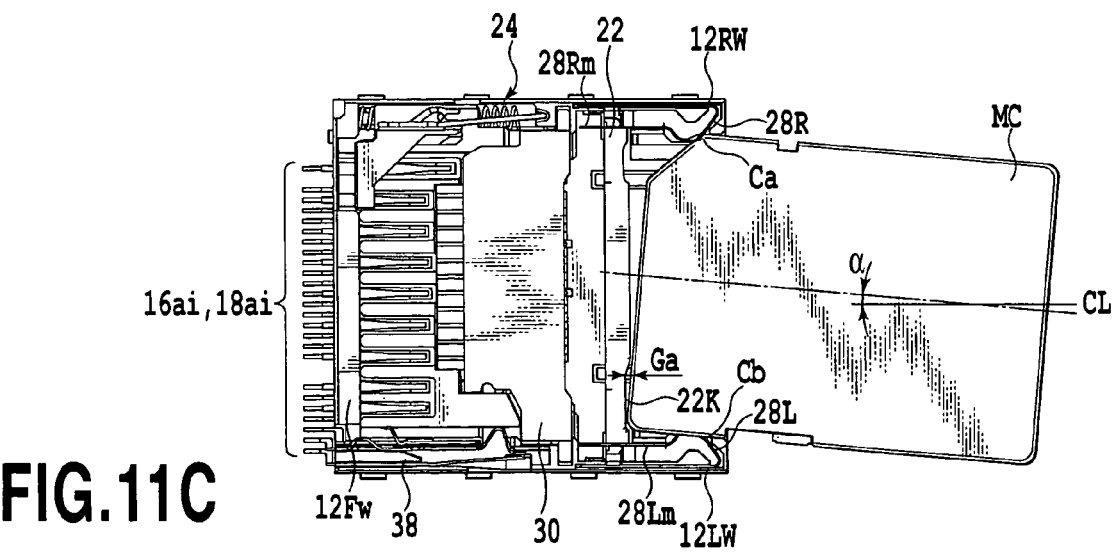
Figure 12:
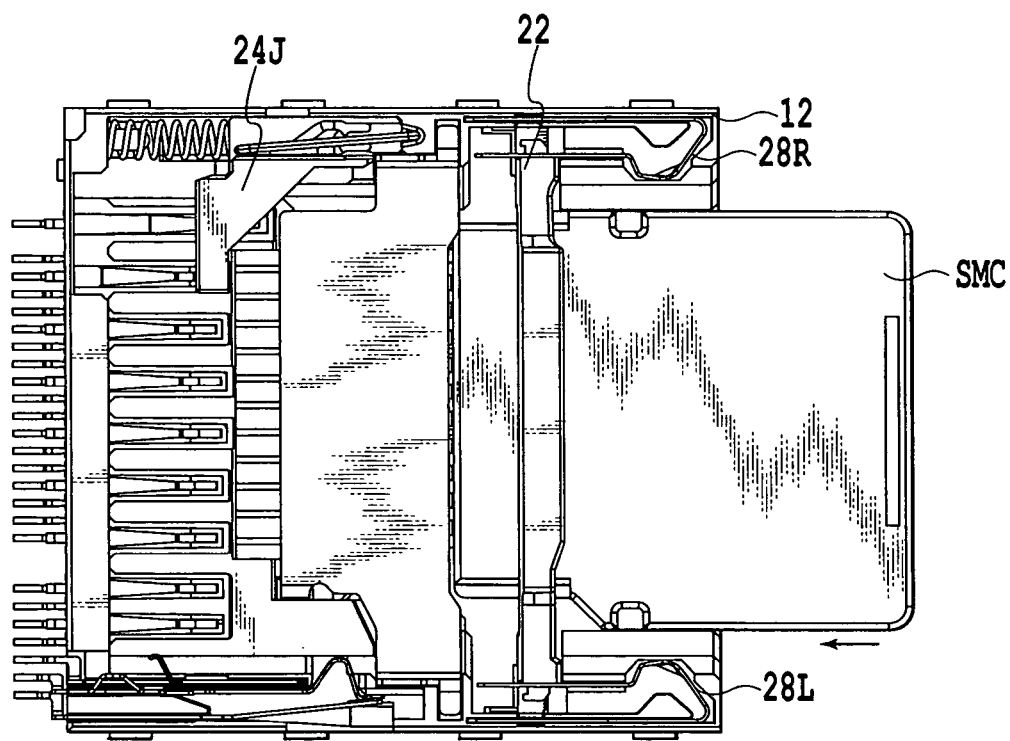
Figure 14:
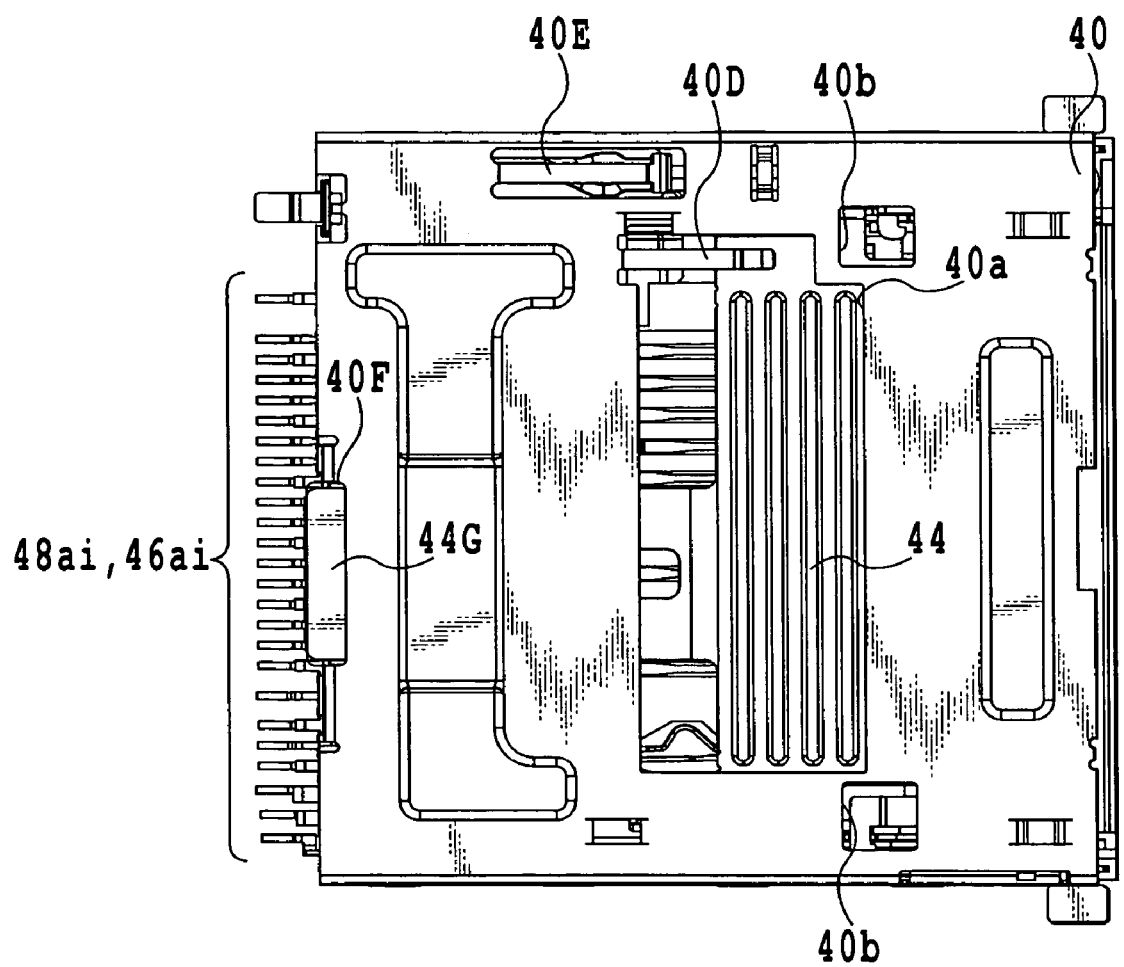
Figure 15:
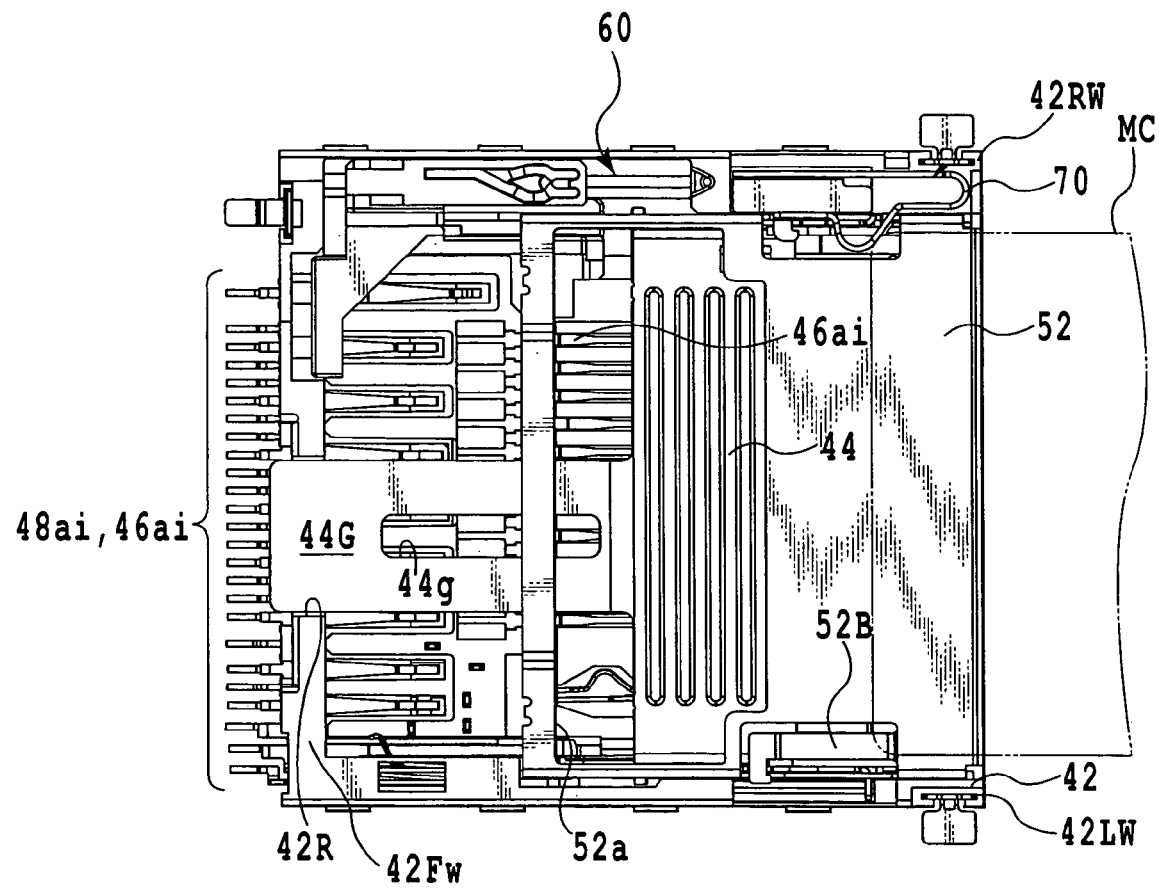
Figure 16:
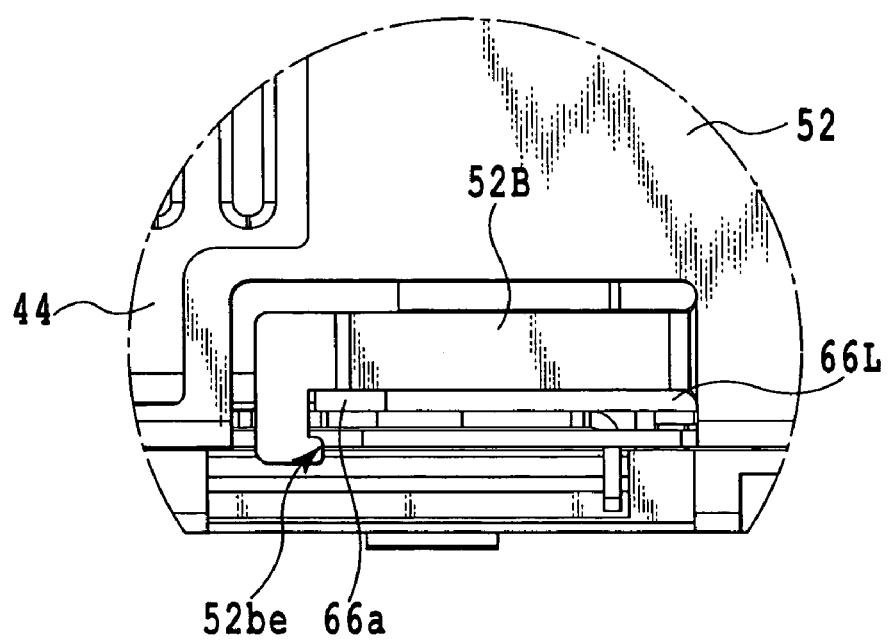
Figure 17:
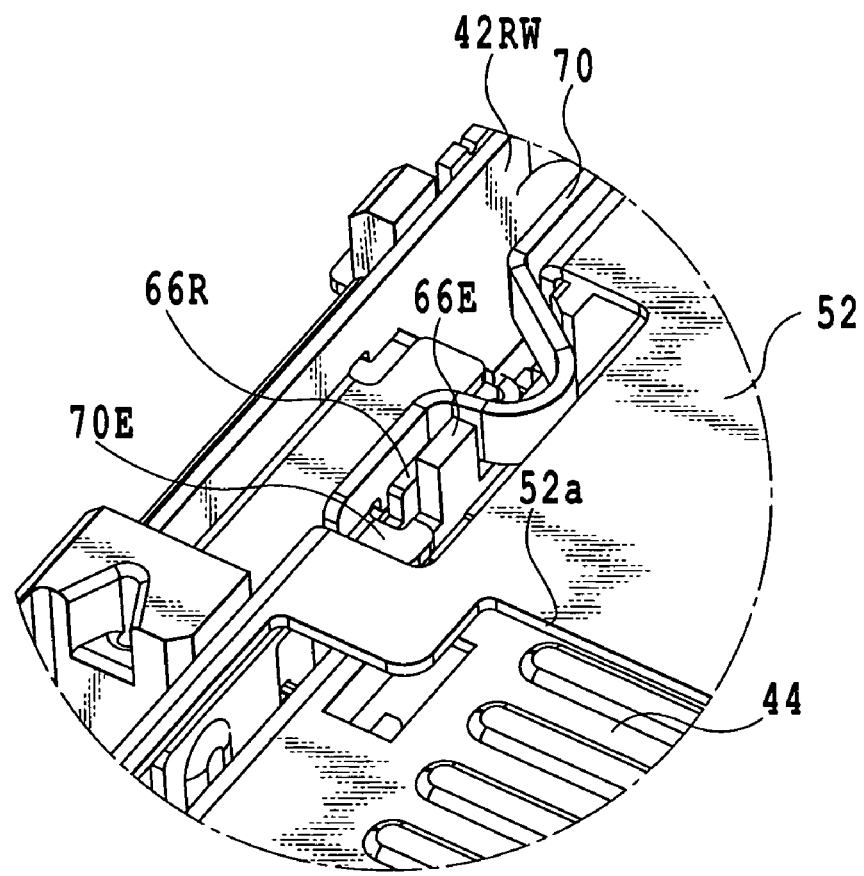
Figure 18:
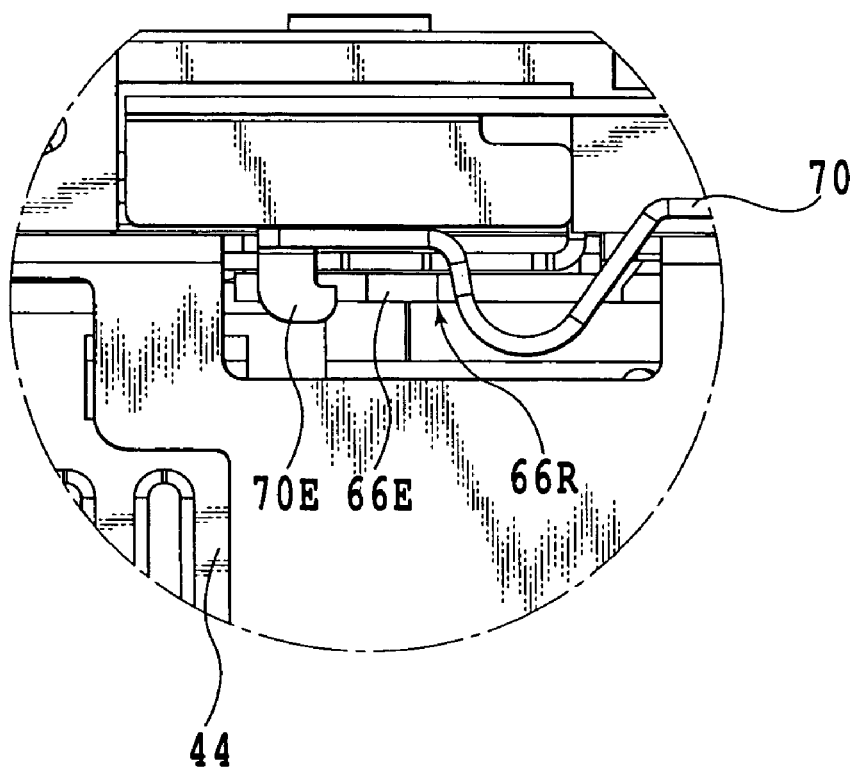
Figure 19:
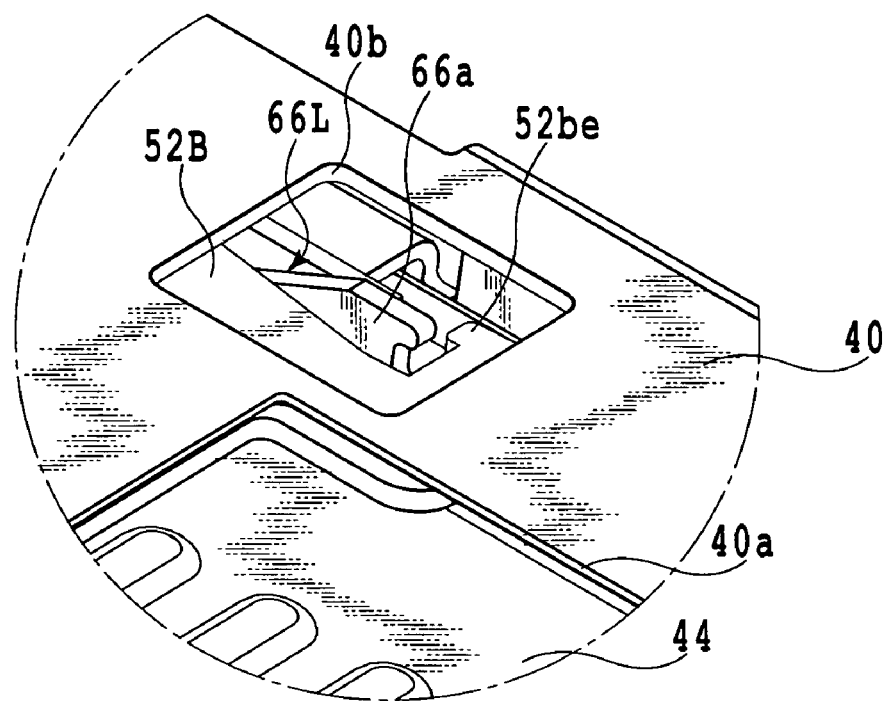
Figure 20A:
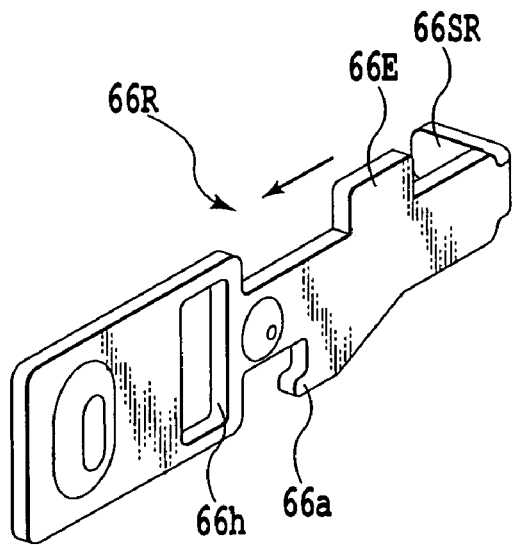
Figure 20B:
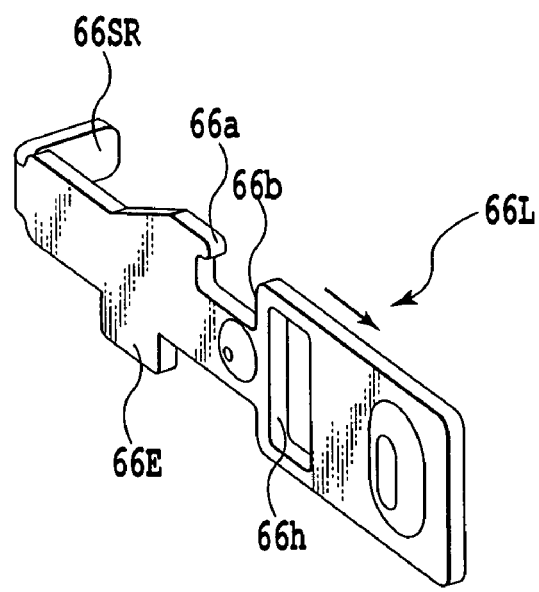

Each of FIGS. 11A, 11B, and 11C is an illustration made available for explaining an operation of a card wrong insertion preventing mechanism at the time of insertion of an IC card;

FIG. 12 is an illustration made available for explaining an operation of a card wrong insertion preventing mechanism at the time of insertion of an IC card;

Each of FIGS. 13A to 13E is an illustration made available for explaining an operation of the card wrong insertion preventing mechanism at the time of wrong insertion of an IC card;

FIG. 14 is a plan view of a second embodiment of an IC card connector according to the present invention showing the external appearance thereof;

FIG. 15 is a plan view showing a base member of the embodiment in FIG. 14 with a cover member removed;

FIG. 16 is a partial plan view enlargedly showing important portions in FIG. 15;

FIG. 17 is a partial perspective view enlargedly showing important portions in FIG. 15;

FIG. 18 is a plan view of the region shown in FIG. 17;

FIG. 19 is a partial perspective view enlargedly showing important portions in FIG. 15; and Each of FIGS. 20A and 20B is a perspective view of a movable plate driving member used in the embodiment shown in FIG. 14.

DESCRIPTION OF PREFERRED EMBODIMENTS

Figure 2:
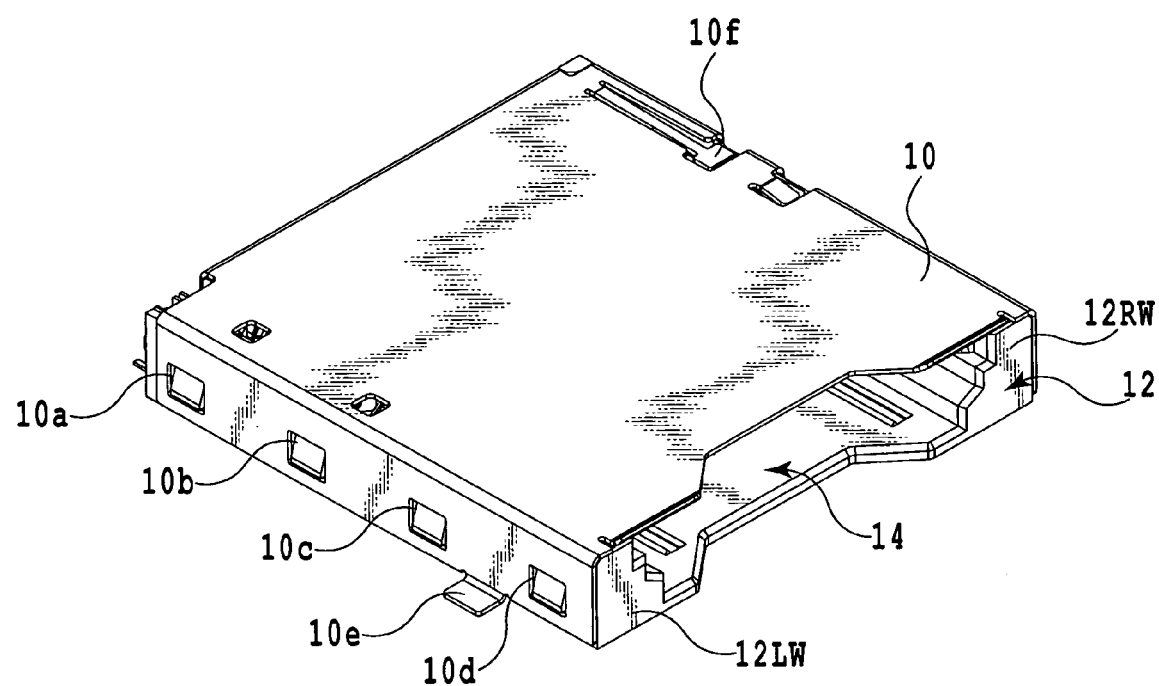
FIG. 2 is a perspective view of the first embodiment of an IC card connector according to the present invention showing the external appearance of the same.
Figure 3:
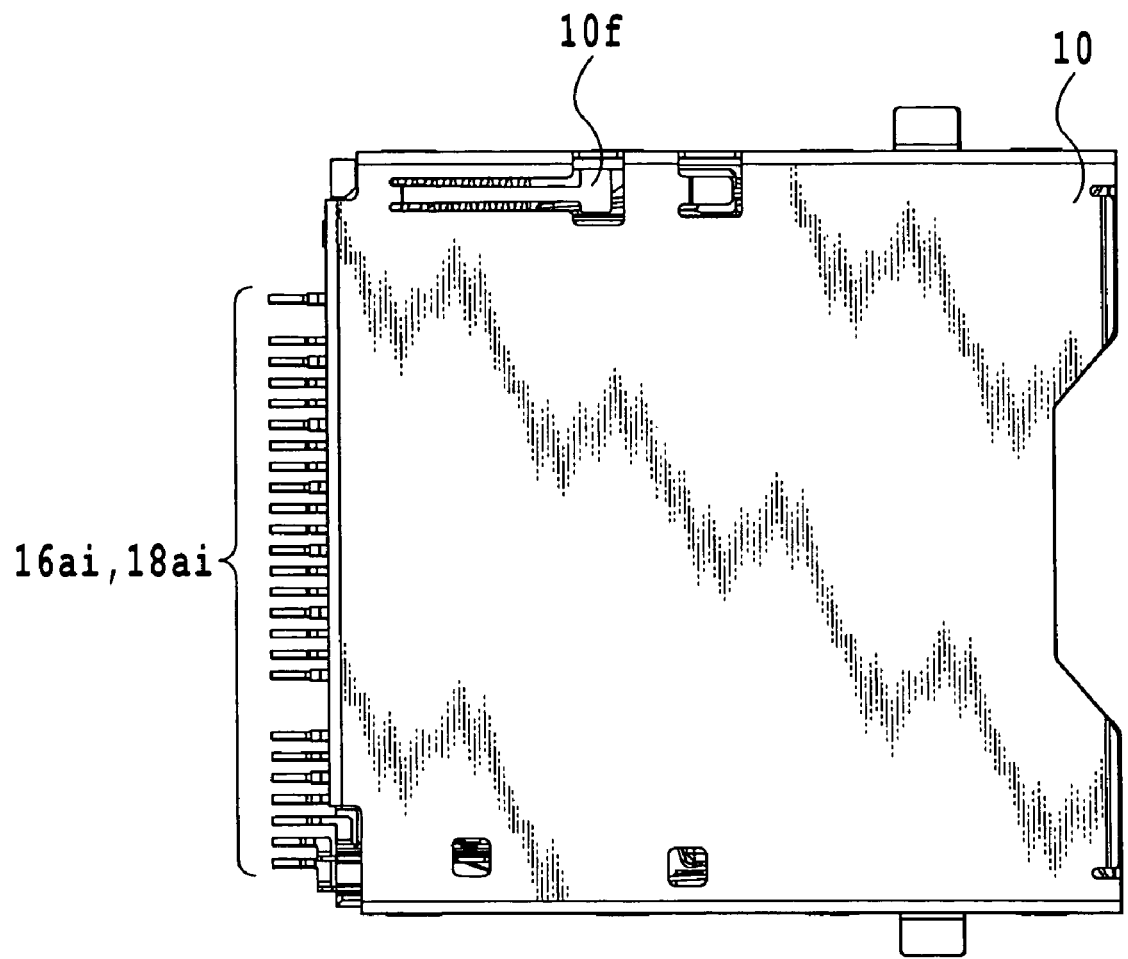
FIG. 3 is a plan view of the embodiment shown in FIG. 2.

FIG. 2 shows the external appearance of a first embodiment of an IC card connector according to the present invention.

The IC card connector shown in FIG. 2 is disposed in a predetermined electronic apparatus, including e.g., a cellular phone, PDA or camera.

The IC card connector shown in FIG. 2 establishes electrical connection between an electrode portion of any of following memory cards as an IC card removably contained in a card accommodation portion thereof, e.g., an SD CARD (secure digital card; trademark) MC as a first IC card or a MINI SD CARD (trademark) SMC as a second IC card (see FIGS. 11A and 12) and a connection terminal portion of a signal input/output substrate disposed in the predetermined electronic apparatus. The IC cards are not limited to the SD CARD and the MINI SD CARD as mentioned above, and they may be two types of cards having different transverse widths arbitrarily selected from among MMCs (multimedia cards; trademark), memory cards incorporating a flash memory or micro hard disk, and SIM (subscriber identity module) cards.

For example, the SD CARD MC has a thickness of about 2.1 mm, and the longitudinal and transverse dimensions of the same are set at about 32 mm and about 24 mm, respectively. For example, the MINI SD CARD SMC has a thickness of about 1.4 mm, and the longitudinal and transverse dimensions thereof are set at about 21.5 mm and about 20 mm, respectively.

The IC card connector comprises a base member 12 on which a plurality of contact terminals are arranged to establish electrical connection with an SD CARD MC or MINI SD CARD SMC contained therein and a cover member 10 forming a multiple accommodation portion for those cards in cooperation with the base member 12.

The cover member 10, which has a gate-like sectional shape, is formed from a thin sheet metal material. As shown in FIG. 2, engaging holes 10a, 10b, 10c, and 10d to be engaged with respective nibs on the base member 12, which will be described later, are formed on one side surface of the cover member 10 in association with the nibs. A plurality of engaging holes (not shown) to be engaged with respective nibs on the base member 12, which will be described later, are formed on the other side surface of the cover member 10.

Therefore, the cover member 10 is secured to the base member 12 by engaging the engaging holes 10a to 10d and the like with the respective nibs on the base member 12.

As shown in FIG. 2, a pressure spring 10f for movably supporting a cam lever 24L of an eject mechanism 24 to be described later is provided on a top surface of the cover member 10 connecting both side surfaces in position near one of the side surfaces. A base end of the pressure spring 10f having elasticity is formed integrally with the cover member 10. For example, the pressure spring 10f is formed by stamping a part of the cover member 10 inwardly using a press process. Therefore, an opening is formed on the cover member 10 around the region corresponding to the pressure spring 10f.

Figure 6:
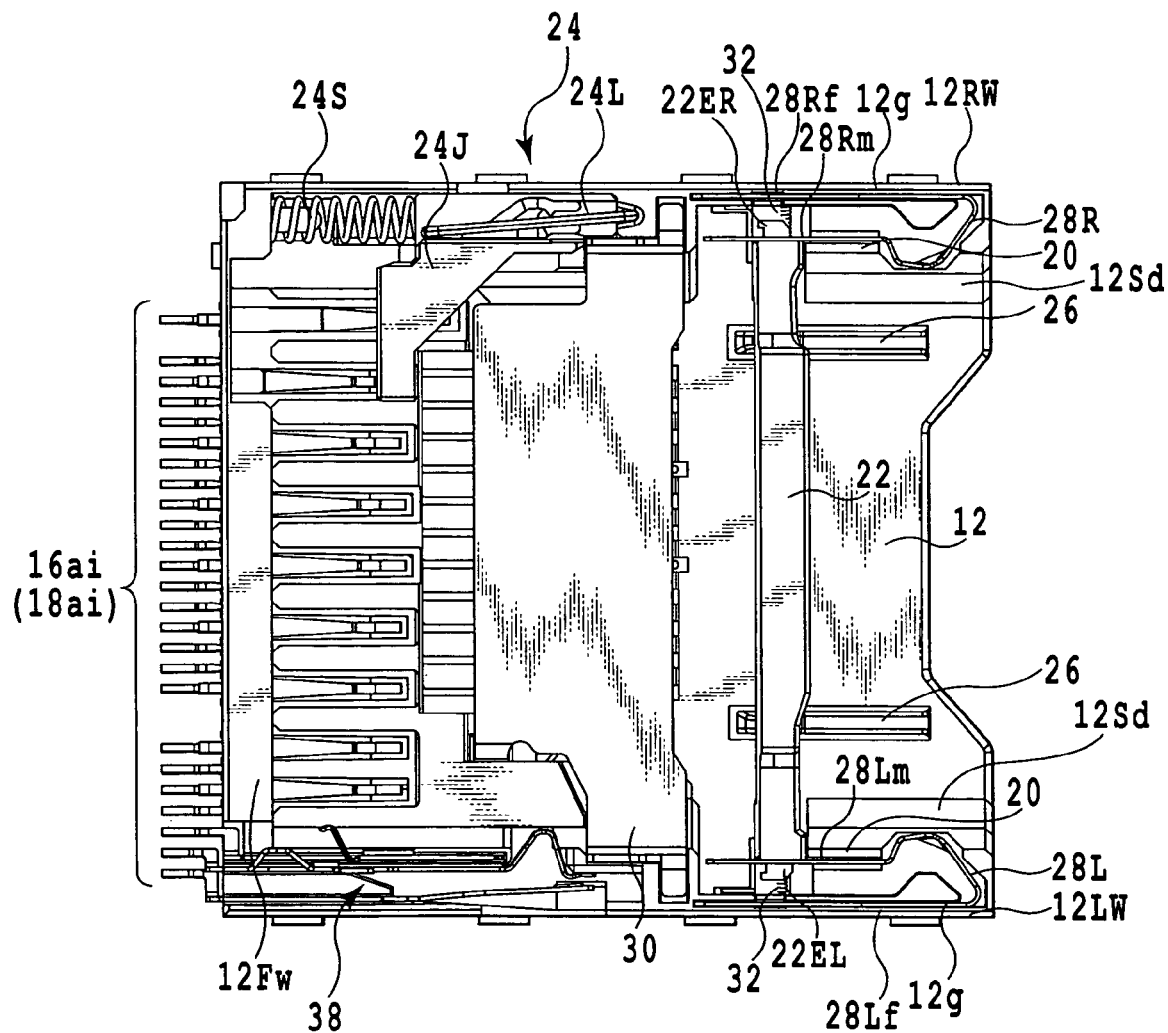
FIG. 6 is a plan view showing a base member of the embodiment in FIG. 2 with a cover member removed.
Figure 7:
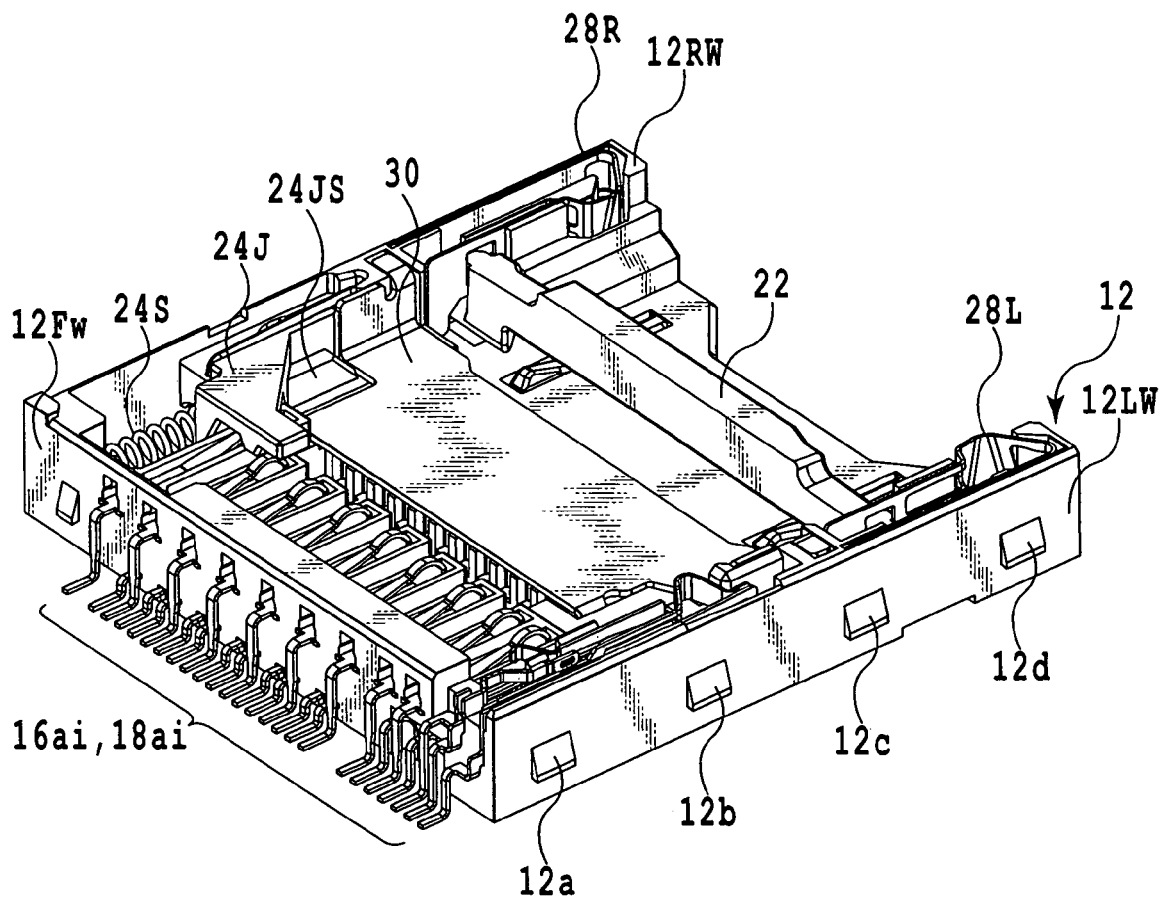
FIG. 7 is a perspective view showing the base member of the embodiment in FIG. 2 with the cover member removed.

As shown in FIGS. 6 and 7, a card accommodation portion 14 of the base member 12 is open on a top side thereof and at an end thereof which is opposite to the side of the same where a contact terminal fixing part to be described later is provided. The card accommodation portion 14 is a multiple card accommodation portion which contains an SD CARD MC in an upper portion thereof and contains a MINI SD CARD SMC in a lower portion thereof such that those cards partially overlap.

Therefore, when the base member 12 is covered by the above-described cover member 10, a common card slot is formed at one end of the card accommodation portion 14, the slot selectively allowing either of SD CARD MC or MINI SD CARD SMC to pass.

Figure 4:
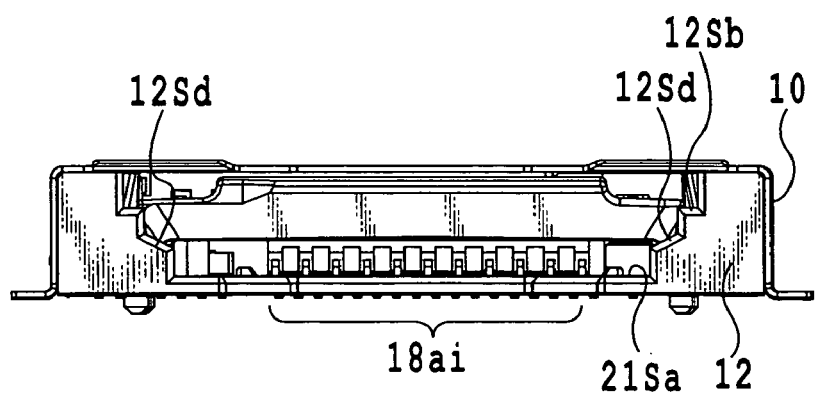
FIG. 4 is a front view of the embodiment shown in FIG. 2.

As shown in FIG. 4, the open end serving as the common card slot has a transverse section in the form of steps corresponding to the shapes of an SD CARD MC and a MINI SD CARD SMC to be inserted.

Figure 5:
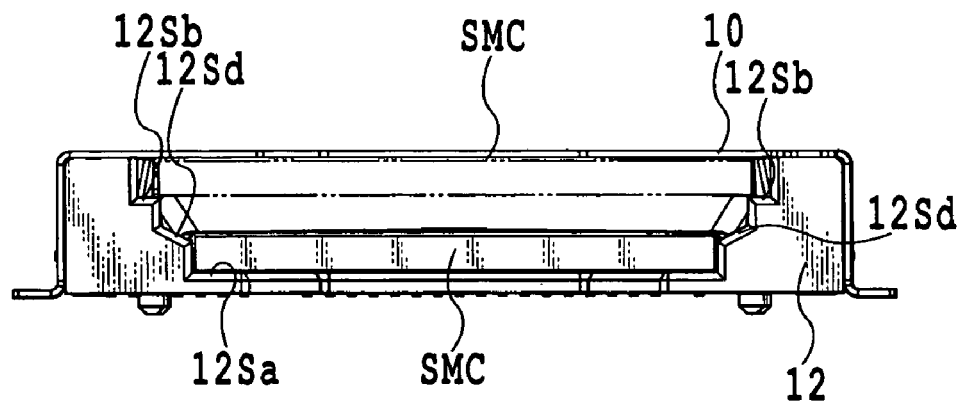
FIG. 5 is a front view enlargedly showing the region in FIG. 4 along with an IC card.

As shown enlargedly in FIG. 5, the open end is formed by a first guide portion 12Sa having a substantially rectangular transverse section and allowing a MINI SD CARD SMC to pass, a second guide portion 12Sb having a transverse section which seems like large and small substantially rectangular shapes stacked the large rectangular hole over the small rectangular hole and allowing an SD CARD MC to pass, and a pair of inclined surface portions 12Sd connecting top ends of the first guide portion 12Sa and bottom ends of the second guide portion 12Sb.

The transverse width of the second guide portion 12Sb is set greater than the transverse width of the first guide portion 12Sa formed under the same such that predetermined gaps are formed between the portion and both side parts of an SD card MC inserted therein. The transverse width of the first guide portion 12Sa is set such that predetermined gaps are formed between the portion and both side parts of a MINI SD CARD SMC inserted therein.

The pair of inclined surface portions 12Sd is formed at an inclination with respect to the top ends of the first guide portion 12Sa and the bottom ends of the second guide portions 12Sb.

As a result, leading ends of an SD CARD MC and a MINI SD CARD SMC pass through the opening while upward or downward guiding leading ends by the second guide portion 12Sb and the first guide portion 12Sa, respectively.

Assuming that the leading end of a MINI SD CARD SMC is inserted into the second guide portion 12Sb by mistake and that the MINI SD CARD SMC is left with the side parts of the same interfering with the bottom parts of the second guide portion 12Sb and the inclined surfaces 12Sd as shown enlargedly in FIG. 5, the leading end of the MINI SD CARD SMC is guided by the inclined surfaces 12Sd into the first guide portion 12Sa in the direction indicated by the arrow shown in FIG. 5.

For example, the base member 12 is integrally molded of a resin molding material. As shown in FIG. 6, the base member 12 includes sidewalls 12RW and 12LW forming two respective side portions of the card accommodation portion 14 in which an SD CARD MC and a MINI SD CARD SMC are removably mounted, and a contact terminal fixing wall 12FW on which contact terminals 18ai (i=1 to 10) for a MINI SD CARD SMC and contact terminals 16*ai* (i=1 to 9) for an SD CARD MC are disposed.

As shown in FIG. 7, nibs 12*a*, 12*b*, 12*c*, and 12*d* are formed on an outer surface of the sidewall 12LW in association with the engaging holes 10*a*, 10*b*, 10*c*, and 10*d* on the cover member 10 described above. Although omitted in the figure, similar nibs are formed in a plurality of locations on an outer surface of the sidewall 12RW in association with the engaging holes on the cover member 10 described above.

For example, as shown in FIG. 6, the plurality of contact terminals 16*ai* are arranged in a row in a region near the contact terminal fixing wall 12FW of the card accommodation portion 14 at predetermined intervals from each other and substantially in parallel with the sidewalls 12RW and 12LW. The plurality of contact terminals 18*ai* are arranged in a row in a position near the card slot of the card accommodation portion 14 at predetermined intervals from each other and substantially in parallel with the sidewalls 12RW and 12LW.

A contact terminal 16*ai* includes a contact portion having elasticity and contacting a contact pad on an SD CARD MC to be electrically connected to the same, a soldered terminal portion soldered and secured to an electrode portion of a circuit board (not shown) to be electrically connected to the same, and a fixed portion connecting the contact portion and the soldered terminal portion with each other and fixed to the base member 12. The fixed portions of the contact terminals 16*ai*, which are made of a sheet metal material such as phosphor bronze for springs, are fixed on the base member 12 by press-fitting them into grooves (not shown) formed on the contact terminal fixing wall 12FW via through holes formed on the contact terminal fixing wall 12FW from the side opposite to the side from which the SD CARD MC is inserted.

A contact terminal 18*ai* includes a contact portion having elasticity and contacting a contact pad on the MINI SD CARD SMC to be electrically connected to the same, a soldered terminal portion soldered and secured to an electrode portion of the above-described circuit board to be electrically connected to the same, and a fixed portion connecting the contact portion and the soldered terminal portion with each other and secured to the base member 12. The fixed portions of the contact terminals 18*ai*, which are made of a sheet metal material such as phosphor bronze for springs, are fixed on the base member 12 by press-fitting them into grooves (not shown) formed on the bottom of the card accommodation portion 14 from the side opposite to the side from which the MINI SD CARD SMC is inserted. A plurality of elastic pieces 26 for urging the MINI SD CARD SMC inserted upward are provided in parallel with each other in positions closer to the card slot than the position where the contact terminals 18*ai* are disposed.

A partition plate 30 for guiding the inserted SD CARD MC toward the contact terminals 16*ai* is provided above the contact terminals 18*ai*.

As shown in FIG. 7, the soldered terminal portions of the contact terminals 16*ai* and 18*ai* protrude outwardly through respective holes on the contact terminal fixing wall 12FW.

As shown in FIG. 6, an eject mechanism 24 for holding the SD CARD MC in the card accommodation portion 14 and selectively ejecting the SD CARD MC from the card accommodation portion 14 is provided in a region inside the sidewall 12RW.

The eject mechanism 24 includes an ejector member 24J supported so as to be movable relative to the base member 12 and selectively holding the SD CARD MC, a coil spring 24S interposed between a wall adjacent to the contact terminal fixing wall 12FW of the base member 12 and the ejector member 24J and urging the ejector member 24J in the direction of ejecting the SD CARD MC, and an ejector member control part for exercising control over the ejector member 24J to hold or release the same on or from the base member 12 selectively in accordance with operations of mounting and removing the SD CARD MC.

The ejector member control part includes a substantially heart-shaped cam element (heart cam) formed on the side of the ejector member 24J where the sidewall 12RW is located as disclosed in JP-A-2004-311416, a lever guide groove formed by a plurality of steps formed around the heart cam, a gate-shaped cam lever 24L which is connected with a hole in the sidewall 12RW at one end thereof and which is slid along the lever guide groove at another end thereof, and the above-described pressure spring 10*f* (see FIG. 2) for the cover member 10.

The pressure spring 10*f* urges a bent end of the cam lever 24L such that it slides in contact with a guide surface of the lever guide groove. Thus, the end of the cam lever 24L is sequentially guided by the steps forming the lever guide groove in accordance with the operation of the ejector member 24J and temporarily held on a cam surface formed on the heart cam, whereby the ejector member 24J along with the SD CARD MC is held in the card accommodation portion 14. When the end of the cam lever 24L leaves the cam surface as a result of an operation of pushing the SD CARD MC further, the ejector member 24J is moved by the urging force of the coil spring 24S in the card ejecting direction along with the SD CARD MC.

As shown in FIG. 7, the ejector member 24J is formed integrally with an eject member 24JS which selectively holds a MINI SD CARD SMC inserted. The eject member 24JS is disposed substantially parallel to the ejector member 24J in a position closer to the card slot by a predetermined distance than the position where the ejector member 24J is located. The eject member 24JS is disposed in a position slightly lower than the position of the ejector member 24J. Thus, the MINI SD CARD SMC is also moved by the above-described ejector mechanism 24 in the card ejecting direction through similar operations.

In the region of the sidewall 12LW facing the eject mechanism 24, a group of detection switches 38 for detecting the presence of an SD CARD MC and the position of a write protect button of the SD CARD MC is provided.

Further, a card wrong insertion preventing mechanism is provided inside the sidewalls 12RW and 12LW forming a part of the card slot of the card accommodation portion 14. As shown in FIGS. 6 and 7, the card wrong insertion preventing mechanism includes a wrong insertion restraining member 22 which touches on the leading end of a MINI SD CARD SMC inserted to restraining the MINI SD CARD SMC from intruding toward the contact terminals 16*ai*, a pair of locking members 28R and 28L for locking state or unlocking state the wrong insertion restraining member 22, and torsion coil springs 32 for urging the wrong insertion restraining member 22 in one direction.

Figure 8A:
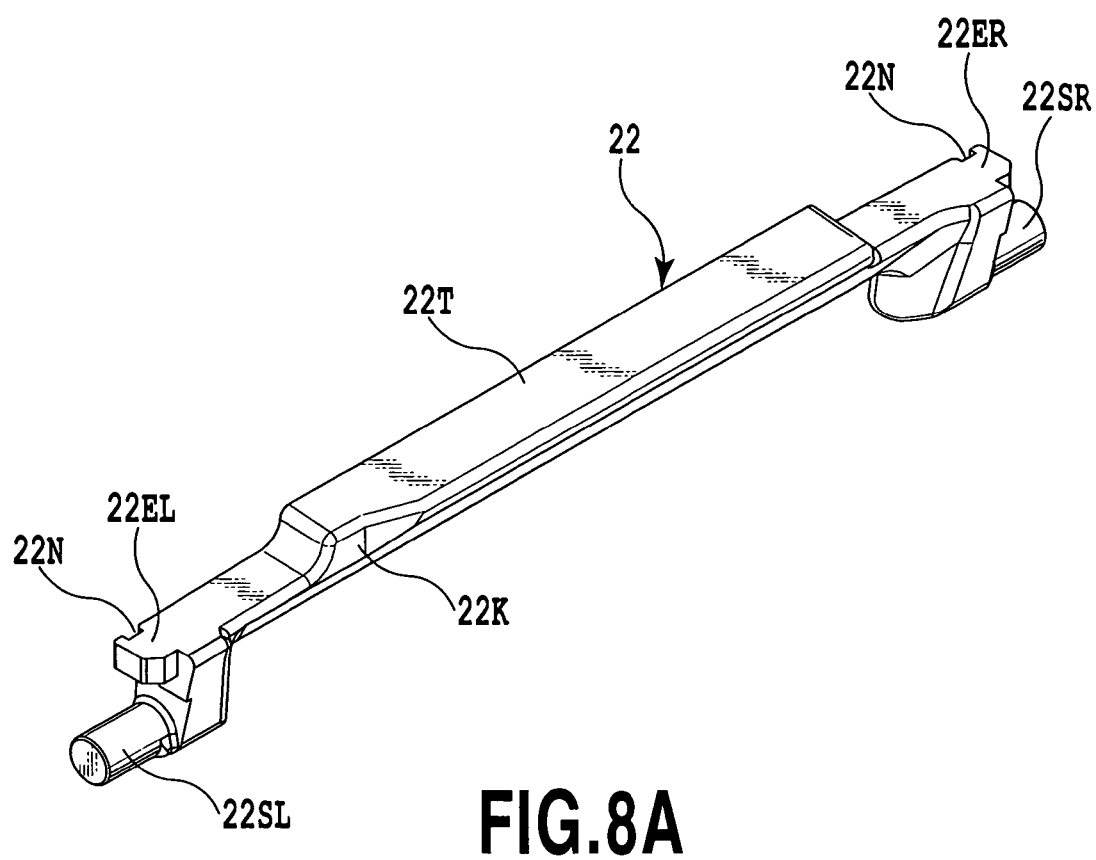
FIG. 8A is a perspective view of a wrong insertion restraining member.
Figure 8B:
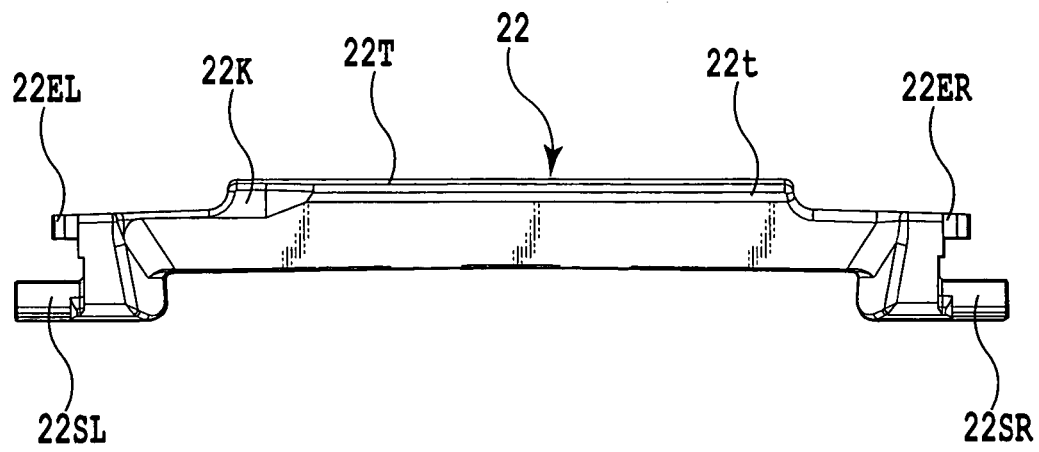
FIG. 8B is a front view of the wrong insertion restraining member shown in FIG. 8A.

As shown enlargedly in FIGS. 8A and 8B, the wrong insertion restraining member 22, which is formed like a crank, includes shaft portions 22SL and 22SR on both ends thereof and a connecting portion 22T connecting the shaft portion 22SL and the shaft portion 22SR provided in the middle.

Each of the columnar shaft portions 22SL and 22SR is rotatably supported by a bearing portion formed in the card accommodation portion 14 of the base member 12. As shown enlargedly in FIG. 1, the movement of the shaft portions 22SL and 22RL in the radial direction thereof is restricted by arcuate portions of movable pieces 28Rm and 28Lm of the locking members 28R and 28L which will be described later, respectively. A torsion coil spring 32 is wound around each of the outer circumference of the shaft portions 22SL and 22SR (see FIGS. 6 and 10). One end of the torsion coil spring 32 is locked at an end of the wrong insertion restraining member 22, and another end of the torsion coil spring 32 is locked at the sidewall of the base member 12. Thus, the wrong insertion restraining member 22 is urged in the direction indicated by the arrow F shown in FIG. 10, that is, a clockwise direction about the shaft portions 22SL and 22SR, or the direction of ejecting the SD CARD MC.

The connecting portion 22T has a touching surface 22t which is located at one end in the longitudinal direction thereof and on which an end of an SD CARD MC or MINI SD CARD SMC touches when inserted. Referring to FIGS. 8A and 8B, a recess 22K having a predetermined depth and inclination is formed in a portion of a left end of the touching surface 22t to extend a predetermined length along the longitudinal direction of the surface.

Notches 22N are formed on both ends of the connecting portion 22T to which the shaft portions 22SL and 22SR are respectively connected, and the notches 22N are locked at the outer edge of openings 28H of the movable pieces 28Rm and 28Lm of the respective locking members 28R and 28L which will be described later. The notches 22N are formed on an end face of the above-described connecting portion 22T opposite to the touching surface 22t.

Therefore, hooked engaging portions 22ER and 22EL to be engaged with the outer edge of the openings 28H of the movable pieces 28Rm and 28Lm are formed on both ends of the connecting portion 22T.

Since the pair of locking members 28R and 28L are identical to each other in structure, the following description will address only the locking member 28R and omit the locking member 28L.

The locking member 28R includes a fixed piece 28Rf which is press-fit into a groove 12g linearly formed on the sidewall 12RW of the base member 12 and the movable piece 28Rm which is formed integrally with one end of the fixed piece 28Rf.

In the portion of the movable piece 28Rm continuous with the end of the fixed piece 28Rf, a curved portion is formed such that it protrudes into the region where a side part of an SD CARD MC passes. Thus, the distance between the curved portion of the locking member 28R and a curved portion of the locking member 28L opposite to the same is a dimension that is slightly smaller than the transverse width dimension of an SD CARD MC and slightly greater than the transverse width dimension of a MINI SD CARD SMC.

Figure 9:
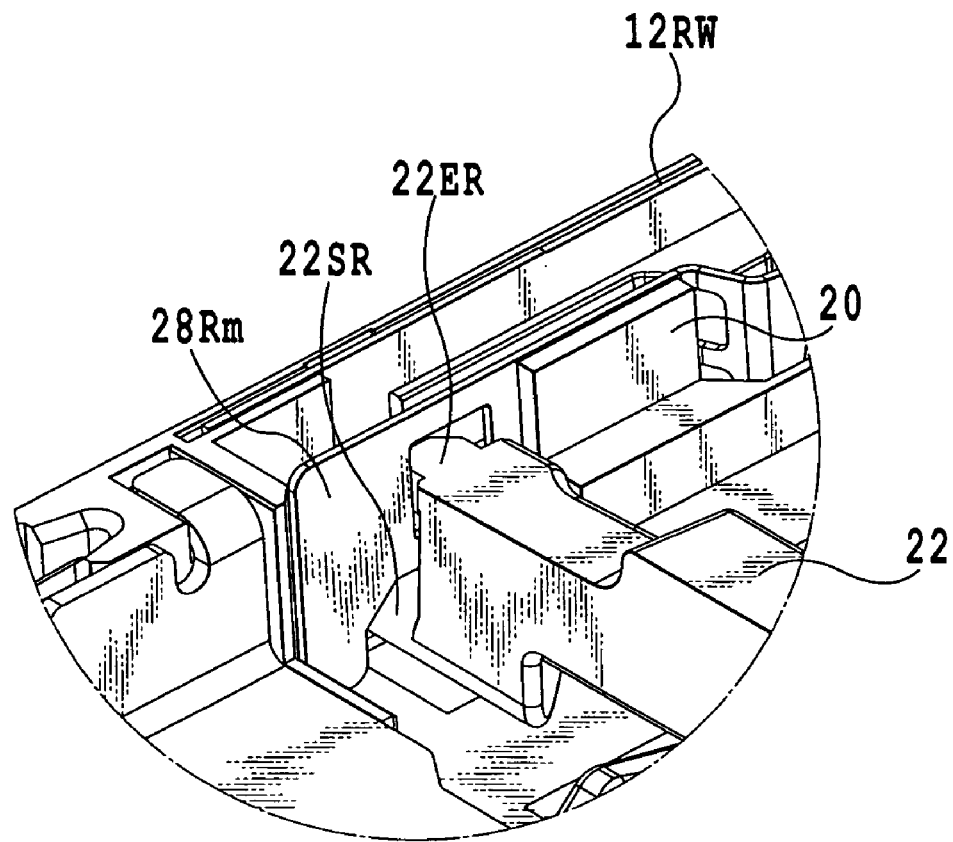
FIG. 9 is a partial perspective view enlargedly showing important portions in FIG. 7.

As shown in FIG. 9, a rectangular opening 28H into which the engaging portion 22ER of the above-described wrong insertion restraining member 22 is inserted is formed at one end of the movable piece 28Rm. A predetermined gap is formed between the outer edge of the opening 28H and the periphery of the engaging portion 22ER such that the end of the movable piece 28Rm can move in the gap. A stopper piece 20 for restricting the initial position of the movable piece 28Rm is provided adjacent to the curved portion of the movable piece 28Rm.

When the side parts of an SD CARD MC pass between the curved portion of the locking member 28R and the curved portion of the locking member 28L opposite to the same, since the curved portions are pressed by the two side parts of the SD CARD MC respectively, the opening 28H of the movable piece 28Rm is spaced apart from the engaging portion 22ER of the wrong insertion restraining member 22. Therefore, the locking members 28R and 28L unlock the wrong insertion restraining member 22.

When the curved portion of the locking member 28R and the curved portion of the locking member 28L opposite to the same transfer from the pressed state to an unpressed state, e.g., when the SD CARD MC is ejected from the card accommodation portion 14, the movable piece 28Rm is returned to the above-described initial position by a restoring force of the curved portion. The engaging portion 22ER of the wrong insertion restraining member 22 is urged and rotated by the urging force of the torsion coil spring 32 and inserted into the opening 28H. Thus, the locking members 28R and 28L lock the wrong insertion restraining member 22 in the initial state again.

In this structure, when an SD CARD MC is mounted in the card accommodation portion 14, as shown in FIGS. 11A and 11B, the curved portion of the locking member 28R and the curved portion of the locking member 28L opposite to the same are pressed in the direction of spacing them from each other by the leading end of the SD CARD MC passing through the card slot. As a result, the openings 28H of the movable piece 28Rm and the movable piece 28Lm are spaced apart from the respective engaging portions 22ER and 22EL of the wrong insertion restraining member 22. The wrong insertion restraining member 22 is thus unlocked.

Subsequently, when the leading end of the SD CARD MC is further inserted in the forward direction, the wrong insertion restraining member 22 is rotated against the urging force of the torsion coil spring 32 with the leading end of the SD CARD MC in contact with the contact surface 22t of the wrong insertion restraining member 22. As a result, as shown in FIG. 11B, the leading end of the card is held in a predetermined position by the eject member 24J after passing directly over the wrong insertion restraining member 22.

Even in case that the leading end of the SD CARD MC is inserted in inclination at an angle equal to or smaller than a predetermined angle α as shown in FIG. 11C, for example, when a portion of an inclined surface at a corner of the SD CARD MC contacts the curved portion of the locking member 28R and a portion of the opposite side of the card contacts the curved portion of the locking member 28L, the curved portion of the locking member 28R and the curved portion of the locking member 28L opposite to the same are easily pressed by the two contacting parts (represented by Ca and Cb) in the direction of spacing the curved portions from each other. The angle α is an angle defined between a centerline CL of the SD CARD MC and a straight line in parallel with the sidewall 12RW.

In this case, a predetermined gap Ga is formed between the end surface of the leading end of the SD CARD MC and the recess 22K of the touching surface 22t of the wrong insertion restraining member 22 such that the end surface of the leading end of the SD CARD MC does not touch the touching surface 22t of the wrong insertion restraining member 22. There is no possibility that the wrong insertion restraining member 22 is locked as described above, and the leading end of the SD CARD MC passes directly over the wrong insertion restraining member 22. Therefore, even when the leading end of an SD CARD MC is inserted at a slight inclination in one direction, the card wrong insertion preventing mechanism does not operate in such a manner that the wrong insertion restraining member 22 is locked as described above, and the SD CARD MC can be smoothly inserted.

On the other hand, to remove the SD CARD MC from the card accommodation portion 14, the SD CARD MC is further pushed in slightly, and the SD CARD MC is moved in the ejecting direction by the urging force of the coil spring 24S of the eject mechanism along with the eject member 24J. At this time, the wrong insertion restraining member 22 is rotated toward the card slot by the urging force of the torsion coil spring 32, and the opening 28H of the movable piece 28Rm of the locking member 28R and the opening 28H of the movable piece Lm of the locking member 28L opposite to the same are returned to the positions opposite to the engaging portions 22ER and 22EL by the restoring force and inserted into those portions. Thus, the wrong insertion restraining member 22 is returned to the initial locked state again.

In the case of the mounting of a MINI SD CARD SMC in the normal position for the same in the card accommodation portion 14, as shown in FIG. 12, the leading end of the MINI SD CARD SMC inserted passes through the guide portion 12Sa of the card slot and the gap between the curved portion of the locking member 28R and the curved portion of the locking member 28L opposite to the same. Then, the leading end passes directly under the connecting portion 22T of the wrong insertion restraining member 22 to be guided to the position of the normal lower card accommodation portion. At this time, the leading end is held in a predetermined position by the above-described eject member 24JS.

On the other hand, to remove the MINI SD CARD SMC from the card accommodation portion 14, the MINI SD CARD SMC is further pushed in slightly, and the MINI SD CARD SMC is moved in the ejecting direction by the urging force of the coil spring 24S of the eject mechanism along with the eject member 24JS.

Figure 13A:
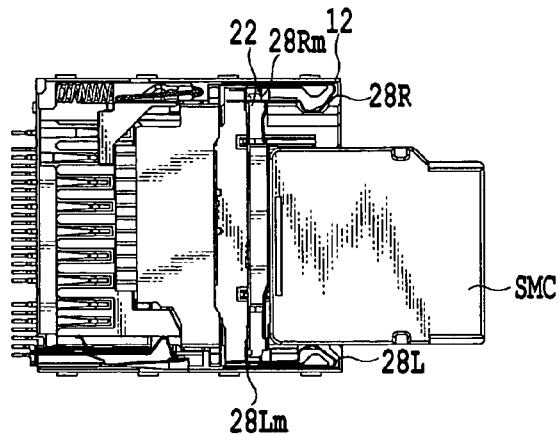

In case that a MINI SD CARD SMC is erroneously inserted with the end of the same having no contact pad formed thereon facing in the forward direction, as shown in FIG. 13A by way of example, the forward end first touches on the touching surface 22t of the wrong insertion restraining member 22, and the left side part of the forward end then presses the curved portion of the locking member 28L. Then, as described above, the movable piece 28Lm is spaced apart from the stopper piece 20 and the engaging portion 22EL of the wrong insertion restraining member 22 to unlock the wrong insertion restraining member 22.

Figure 1:
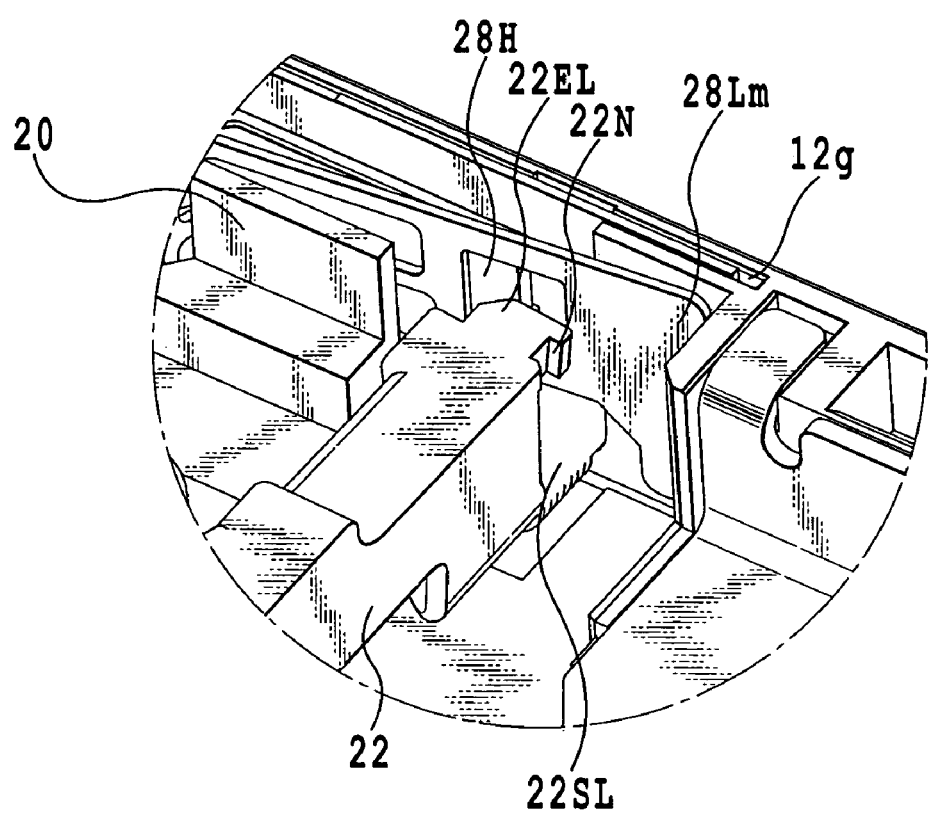
FIG. 1 is a perspective view showing partial enlargedly an important portion of an embodiment of a first embodiment of an IC card connector according to the present invention.
Figure 13B:
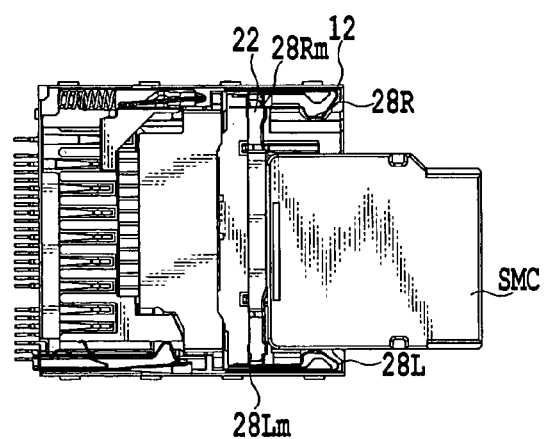

When the touching portion 22t of the wrong insertion restraining member 22 thus unlocked is further pressed by the forward end of the MINI SD CARD SMC against the urging force of the torsion coil spring 32 as shown in FIG. 13B, the urging force of the torsion coil spring 32 and the restoring force of the movable piece 28Lm are balanced as shown enlargedly in FIG. 1, and the end surface of the engaging portion 22EL of the wrong insertion restraining member 22 is thereby kept in contact with the movable piece 28Lm. At this time, the engaging portion 22ER of the wrong insertion restraining member 22 is rotated from the state indicated by the two-dot chain line in FIG. 10 to the state indicated by the chain line such that a portion of the notch 22N fits the outer edge of the opening 28H. Since the engaging portion 22ER is therefore not unlocked, the wrong insertion restraining member 22 prevents the wrong insertion of the MINI SD CARD SMC.

Figure 10:
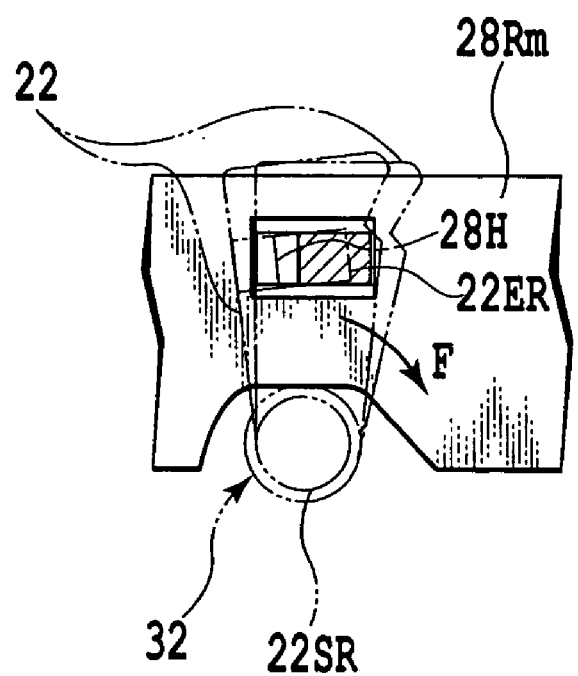
FIG. 10 is an illustration made available for explaining an operation of the wrong insertion restraining member.
Figure 13D:
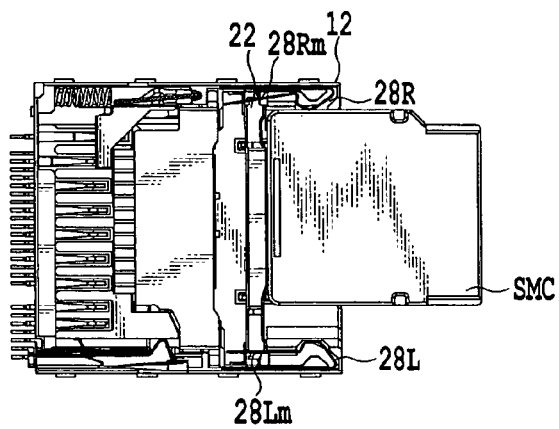
Figure 13C:
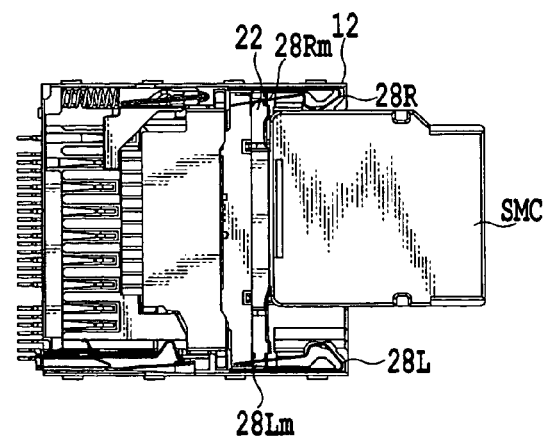

Subsequently, as shown in FIG. 13C, when the right side part of the forward end of the MINI SD CARD SMC presses the curved portion of the locking member 28R with the forward end of the MINI SD CARD SMC in contact with the touching surface 22t of the wrong insertion restraining member 22, as described above, the engaging portion 22ER of the wrong insertion restraining member 22 has been rotated from the state indicated by the two-dot chain line in FIG. 10 to the state indicated by the chain line such that a portion of the notch 22N engages the outer edge defining the opening 28H. Therefore, the engaging portion 22ER of the wrong insertion restraining member 22 is kept locked to the opening 28H of the locking member 28R and is not unlocked. Therefore, the wrong insertion restraining member 22 prevents the insertion operation of the MINI SD CARD SMC.

Figure 13E:
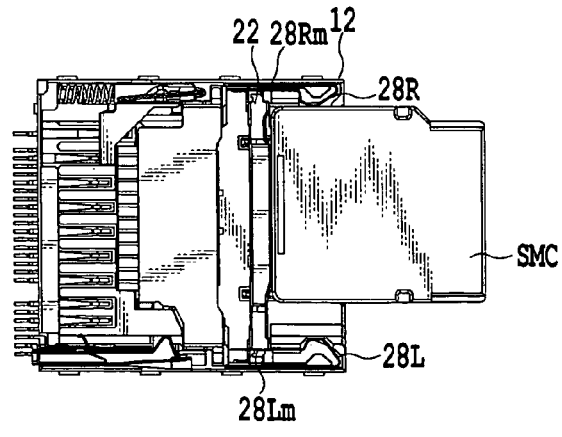

When the forward end of the MINI SD CARD SMC is moved away from the touching surface 22t of the wrong insertion restraining member 22 in the card ejecting direction as shown in FIGS. 13D and 13E, the engaging portion 22EL of the wrong insertion restraining member 22 is returned to the initial position by the urging force of the coil spring 32, whereby the engaging portion 22EL returns to the state of being locked to the opening 28H of the locking member 28L.

FIG. 14 shows a second embodiment of an IC card connector according to the invention.

In the embodiment shown in FIG. 2, the wrong insertion restraining member 22 of the card wrong insertion preventing mechanism prevents wrong insertion of a MINI SD CARD SMC in a configuration in which the member is rotatably supported on the base member 12. In the embodiment shown in FIG. 14, a card wrong insertion preventing movable plate 44 of a card wrong insertion preventing mechanism prevents wrong insertion of a MINI SD CARD SMC in a configuration in which the plate is supported such that it can be moved up and down with reference to a base member 42. In FIG. 15 which will be described later, elements identical to constituent elements of the embodiment shown in FIG. 2 are indicated by like reference numerals and will not be described to avoid duplication.

Such an IC card connector is also disposed in a predetermined electronic apparatus such as a portable telephone, a PDA or a camera.

The IC card connector shown in FIG. 14 is similar to the above-described embodiment in that it establishes electrical connection between, for example, an electrode part of either an SD CARD MC as a first IC card or a MINI SD CARD (trademark) SMC as a second IC card and a connection terminal part of a signal input/output substrate disposed in the predetermined electronic apparatus.

The IC card connector comprises a base member 42 on which a plurality of contact terminals are arranged to establish electrical connection with an SD CARD MC or MINI SD CARD SMC contained therein and a cover member 40 forming a multiple accommodation portion for those cards in cooperation with the base member 42.

The cover member 40, which has a gate-like sectional shape, is formed from a metal material in the form of a sheet.

The cover member 40 is secured to the base member 42 by engaging engaging holes and the like (not shown) formed on a side surface thereof with respective nibs on the base member 42.

As shown in FIG. 14, an opening 40a is formed in the middle of a top surface of the cover member 40 connecting both side surfaces of the same. One end of an elastic piece 40D in the form of a plate for urging a wrong insertion preventing movable plate to be described later downward is connected to the outer edge of the opening 40a. Another end of the elastic piece 40D protrudes into the opening 40a. A plurality of openings 40b is formed adjacent to the opening 40a at predetermined intervals from the same.

A pressure spring 40E for movably supporting a cam lever of an eject mechanism 60 to be described later is provided on the top surface near one of the side surfaces thereof. A base end of the pressure spring 40E having elasticity is formed integrally with the cover member 40. For example, the pressure spring 40E is formed by stamping a part of the cover member 40 inwardly using a press process. Therefore, an opening is formed on the cover member 40 around the region corresponding to the pressure spring 40E.

A card accommodation portion of the base member 42 is open on the top side thereof and at an end thereof opposite to the side thereof where a contact terminal fixing part to be described later is provided. The card accommodation portion is a multiple card accommodation portion which contains an SD CARD MC in an upper portion thereof and contains a MINI SD CARD SMC in a lower portion thereof such that those cards partially overlap.

The open end has a transverse section in the form of steps corresponding to the shapes of an SD CARD MC and a MINI SD CARD SMC to be inserted. As a result, the forward ends of the SD CARD MC and the MINI SD CARD SMC pass through the open end upward or downward under guidance provided by inner walls on both of the step-like shapes.

Therefore, when the base member 42 is covered by the above-described cover member 40, a common card slot is formed at one end of the card accommodation portion, the slot selectively allowing either of the SD CARD MC and the MINI SD CARD SMC to pass.

For example, the base member 42 is integrally molded of a resin molding material. As shown in FIG. 15, the base member 42 includes sidewalls 42RW and 42LW forming two respective side portions of the card accommodation portion in which an SD CARD MC and a MINI SD CARD SMC are removably mounted, and a contact terminal fixing wall 42FW on which contact terminals 46$ai$ (i=1 to 10) for a MINI SD CARD SMC and contact terminals 48$ai$ (i=1 to 9) for a SD CARD MC are disposed.

Nibs are formed on an outer surface of the sidewall 42LW. Similar nibs are formed in a plurality of locations on an outer surface of the sidewall 42RW.

For example, as shown in FIG. 15, the plurality of contact terminals 48$ai$ are arranged in a row in a region near the contact terminal fixing wall 42FW of the card accommodation portion at predetermined intervals from each other and substantially in parallel with the sidewalls 42RW and 42LW. The plurality of contact terminals 46$ai$ are arranged in a row in a position near the card slot of the card accommodation portion at predetermined intervals from each other and substantially in parallel with the sidewalls 42RW and 42LW.

A contact terminal 48$ai$ includes a contact portion having elasticity and contacting a contact pad on an SD CARD MC to be electrically connected to the same, a soldered terminal portion soldered and secured to an electrode portion of a circuit board (not shown) to be electrically connected to the same, and a fixed portion connecting the contact portion and the soldered terminal portion with each other and fixed to the base member 42. A contact terminal 46$ai$ includes a contact portion having elasticity and contacting a contact pad on a MINI SD CARD SMC to be electrically connected to the same, a soldered terminal portion soldered and secured to an electrode portion of the above-described circuit board to be electrically connected to the same, and a fixed portion connecting the contact portion and the soldered terminal portion with each other and fixed to the base member 42. The soldered terminal portions of the contact terminals 48$ai$ and 46$ai$ protrude outwardly through respective holes on the contact terminal fixing wall 42FW.

A groove having a predetermined width to be engaged with a bent portion of the cover member 40 inserted therein is formed substantially in the middle of the top end of the contact terminal fixing wall 42FW. A guide portion 44G of a wrong insertion preventing movable plate 44 to be described later is movably inserted in a slit 40F on the bent portion of the cover member 40 so as to protrude from the slit.

An eject mechanism 60 for holding an SD CARD MC in the card accommodation portion and for selectively ejecting the SD CARD MC from the card accommodation portion is provided in a region inside the sidewall 42RW. The configuration of the eject mechanism 60 will not be described because it is the same as the configuration of the eject mechanism 24 in the above-described embodiment.

A card wrong insertion preventing mechanism is provided in the card accommodation portion between the cover member 40 and the contact terminals 48$ai$ and 46$ai$.

Major elements included in the card wrong insertion mechanism are a locking member supporting body 52 secured directly under the cover member 40 and including a locking member 52B, a pair of movable plate driving members 66R and 66L which are disposed inwardly on both sides of the locking member supporting body 52 such that each of them can move in the card mounting/removing direction, the driving members being connected to a card wrong insertion preventing movable plate 44 to be described later at one end thereof, a card wrong insertion preventing movable plate 44 for preventing a MINI SD CARD SMC from entering the upper chamber, and return springs (not shown) for urging the movable plate driving members 66R and 66L to return them to their initial positions.

The locking member supporting body 52 has an opening 52$a$ substantially in the middle thereof. A locking member 52B is formed at the outer edge of the opening 52$a$ near the sidewall 42LW. One end of the locking member 52B is coupled with the locking member supporting body 52 such that it can be elastically displaced. As shown enlargedly in FIG. 16, a hooked locking portion 52$be$ is provided on another end of the locking member 52B. The locking portion 52$be$ is selectively engaged with the outer edge of a recess 66$b$ on the movable plate driving member 66L or a hooked protruding piece 66$a$ formed at the circumferential edge of the recess 66$b$ (see FIG. 20B). The end of the protruding piece 66$a$ protrudes across the moving direction of the movable plate driving member 66L. As a result, when the locking portion 52$be$ is engaged with the outer edge of the recess 66$b$, the movable plate driving member 66L is restrained from movement in the card mounting/removing direction or locked.

When the locking portion 52$be$ is pushed upward by an end of an SD CARD MC inserted, since the locking portion 52$be$ is disengaged from the recess 66$b$ of the movable plate driving member 66L, the movable plate driving member 66L is released to become unlocked.

As shown in FIG. 20B, the movable plate driving member 66L, which is in the form of a plate, has a configuration similar to that of a movable plate driving member 66R to be described later (see FIG. 20A). The member 66L includes the protruding piece 66$a$ which protrudes at the periphery of the recess 66$b$ that is formed on an edge of one side of the same such that it extends substantially orthogonally to the locking portion 52$be$ of the locking member 52B, a protrusion 66E formed on an edge of another side of the same, a spring receiver 66SR formed by bending one end thereof, and a slot 66h provided on the side of another end thereof.

The movable plate driving member 66L is disposed such that the protrusion 66E is slid in contact with a surface of the base member 42.

A connecting end of the card wrong insertion preventing movable plate 44 to be described later is inserted in the slot 66h to be connected with the same. The spring receiver 66SR protrudes through a slot formed on a side surface of the locking member support body 52. One end of a return spring (not shown) is engaged with the spring receiver 66SR. Another end of the return spring is engaged with a step portion of the sidewall 42LW.

When the movable plate driving member 66L is urged and moved by the end of the SD CARD MC against the urging force of the return spring (not shown), the card wrong insertion preventing movable plate 44 is moved in the card inserting direction. When the SD CARD MC is ejected, the movable plate driving member 66L is returned to the initial position by the urging force of the return spring along with the card wrong insertion preventing movable plate 44.

As shown on an enlarged scale in FIG. 17, a locking member 70 for selectively locking the movable plate driving member 66R is provided between the locking member supporting body 52 and the sidewall 42RW.

The locking member 70 includes a fixed piece fixed on the sidewall 42RW and a movable piece having a hooked locking end 70E which selectively engages the protrusion 66E of the movable plate driving member 66R. The movable piece includes a curved portion which is urged by a side part of the SD CARD MC when the SD CARD MC passes through the same, the curved portion being continuous with the locking end 70E. The curved portion protrudes into the card accommodation portion where the SD CARD MC passes. When the curved portion is urged by the side part of the SD CARD MC, the locking end 70E is released from the state shown in FIG. 18 and moved along a side of the protrusion 66E of the movable plate driving member 66R toward the side wall 42RW. Thus, the movable plate driving member 66R is unlocked. FIGS. 17 and 18 show the locked state of the movable plate driving member 66R.

As shown in FIG. 15, the card wrong insertion preventing movable plate 44 is movably disposed in a position directly under the locking member supporting body 52.

The card wrong insertion preventing movable plate 44, which is substantially T-shaped, includes a card guiding portion which guides a MINI SD CARD SMC for a downward advance when the movable plate driving member 66 is in the locked state and a guide portion 44G which is connected to an end of the card guiding portion so as to intersect with the same substantially perpendicularly and which guides the card wrong insertion preventing movable plate 44.

Protruding pieces are formed at a predetermined interval on both side surfaces of the card guiding portion in engagement with respective guide grooves (not shown) on the locking member supporting body 52 and respective slots 66h of the movable plate driving members 66L and 66R.

The sheet-like guide portion 44G is connected to the card guiding portion in a position biased from the center of the guiding portion toward one end in the longitudinal direction of the same. The guide portion 44G has a slot 44g in the middle thereof. One end of the guide portion 44G is movably inserted in a rectangular slit 40F on the cover member 40. As a result, the card wrong insertion preventing movable plate 44 will not be undesirably tilted in movement because it is moved while being guided by the slit 40F.

When an SD CARD MC is mounted in the card accommodation portion in such a configuration, the curved portion of the locking member 70 and the locking portion 52be of the locking member 52B are urged by the leading end of the SD CARD MC passing through the card slot, and each of the movable plate driving members 66R and 66L is unlocked as described above. Then, the movable plate driving members 66R and 66L are moved into the card accommodation portion against the urging force of the return spring.

Thus, the protruding pieces of the card wrong insertion preventing movable plate 44 are engaged with the respective guide grooves and elevated after being slid along them. The movable plate thus abuts on an inner surface of the cover member 40, and the SD CARD MC passes directly under the card wrong insertion preventing movable plate 44 to be held in a predetermined position by the eject member.

To remove the SD CARD MC from the card accommodation portion, the SD CARD MC is further pushed in slightly. Then, the SD CARD MC is moved by the urging force of the coil spring of the eject mechanism in the ejecting direction along with the eject member, and the card wrong insertion preventing movable plate 44 starts moving downward to be returned to the initial position along with the movable plate driving members 66R and 66L by the urging force of the return spring.

When a MINI SD CARD SMC is mounted in a normal position in the card accommodation portion, since the movable plate driving members 66R and 66L are locked, the leading end of the MINI SD CARD SMC inserted is regulated by an end of the guiding portion of the card wrong insertion preventing movable plate 44 rightly downward and introduced into the normal lower accommodation portion.

Let us assume that a MINI SD CARD SMC is inserted into the upper side of the card accommodation portion by mistake; the curved portion of the locking member 70 is urged by the side parts of the MINI SD CARD SMC; and the movable plate driving member 66R is unlocked. When the guiding portion of the card-wrong insertion preventing movable plate 44 is further urged by the leading end of the MINI SD CARD SMC, the movable plate driving member 66L is moved in the direction indicated by the arrow in FIG. 20B as shown on an enlarged scale in FIG. 19 by a slight movement of the card wrong insertion preventing movable plate 44. As a result, the protruding piece 66a of the movable plate driving member 66L is engaged with the locking portion 52be of the locking member 52B. It is therefore possible to reliably prevent the MINI SD CARD SMC from being inserted into the wrong card accommodation portion because the movable plate driving member 66L is locked.

Even when urged by the side parts of the MINI SD CARD SMC and the locking member 52B is unlocked from the movable plate driving member 66L, the movable plate driving member 66R is similarly moved in the direction indicated by the arrow shown in FIG. 20A. As a result, the protrusion 66E of the movable plate driving member 66R is engaged with the locking end 70E of the locking member 70. It is therefore possible to reliably prevent the MINI SD CARD SMC from being inserted into the wrong card accommodation portion because the movable plate driving member 66R is locked.

What is claimed is:

1. An IC card wrong insertion preventing mechanism comprising:
   a wrong insertion restraining member extending in an IC card accommodation portion in a direction across an IC card mounting/removing direction and rotational movably supported, said wrong insertion restraining member being situated in a first position for guiding a leading end of a first IC card such that the leading end of the first IC card is oriented toward one direction when the first IC card is mounted in the IC card accommodation portion and being situated in a second position for guiding a leading end of a second IC card such that the leading end of the second IC card is oriented toward another direction when the second IC card is mounted in the IC card accommodation portion;

an urging member for urging said wrong insertion restraining member in the direction of ejecting the first IC card; and a pair of locking members each including an elastically displaceable movable piece having an opening to be engaged with engaging portions formed on both ends of said wrong insertion restraining member and selectively keeping said wrong insertion restraining member in the second position when the second IC card is mounted in the IC card mounting portion, wherein each of the engaging portions of said wrong insertion restraining member has a notch to be engaged with an outer edge of the opening of the locking member when the wrong insertion restraining member is rotated at a predetermined angle in the second position.

2. The IC card wrong insertion preventing mechanism according to claim 1, wherein said wrong insertion restraining member has a touching surface which is orthogonal to the mounting/removing direction of the first IC card and the second IC card and against which the leading end of the first IC card or second IC card touches and wherein a recess is provided on one end of the touching surface of said wrong insertion restraining member such that a gap is formed between the end surface of the first IC card in the forward direction thereof and the touching surface when the first IC card is obliquely inserted between the pair of locking members at an angle of inclination within a predetermined angle with respect to the mounting/removing direction of the first IC card.

3. An IC card wrong insertion preventing mechanism comprising:

a wrong insertion preventing movable member provided in an IC card accommodation portion such that it can be moved up and down while being slid in an IC card mounting/removing direction, said wrong insertion preventing movable member being situated in a first position for guiding a leading end of a first IC card such that the leading end of the first IC card is oriented toward one direction when the first IC card is mounted in the IC card accommodation portion and situated in a second position for guiding a leading end of a second IC card such that the leading end of the second IC card is oriented toward another direction when the second IC card is mounted in the IC card accommodation portion;

a position control mechanism portion for situating said wrong insertion preventing movable member in the first position or second position; and a lock/unlock mechanism including a movable plate driving member connected with said wrong insertion preventing movable member and a locking member for selectively restricting the movement of the movable plate driving member in accordance with the mounting and removal of the first and second IC cards, wherein at least either of the movable plate driving member and the locking member is provided with a hooked protrusion for selectively engaging them with each other when the movable plate driving member is moved with said wrong insertion preventing movable member situated in the second position.

4. An IC card connector comprising:

an IC card accommodation portion for containing a first IC card or second IC card having different shapes each other, including a card slot through which either of the first and second IC cards can be selectively passed and said IC card accommodation portion having a plurality of types of contact terminal groups for electrically connecting electrode portions of the first and second IC cards; and an IC card wrong insertion preventing mechanisms according to claim 1.

5. An IC card connector comprising:

an IC card accommodation portion for containing a first IC card or second IC card having different shapes each other, including a card slot through which either of the first and second IC cards can be selectively passed and said IC card accommodation portion having a plurality of types of contact terminal groups for electrically connecting electrode portions of the first and second IC cards; and an IC card wrong insertion preventing mechanisms according to claim 3.

* * * * *